United States Patent
Borjanin

(10) Patent No.: US 9,791,114 B2
(45) Date of Patent: Oct. 17, 2017

(54) SAFETY TORCH; SET COMPRISING A TORCH AND A CARTRIDGE; HOLDER FOR A SAFETY TOOL

(71) Applicant: Life Safety Products B.V., Zoetermeer (NL)

(72) Inventor: Dalibor Borjanin, Zoetermeer (NL)

(73) Assignee: Life Safety Products B.V., Zoetemeer (NL)

( * ) Notice: Subject to any disclaimer, the term of this patent is extended or adjusted under 35 U.S.C. 154(b) by 0 days.

(21) Appl. No.: 14/786,347

(22) PCT Filed: Apr. 25, 2014

(86) PCT No.: PCT/NL2014/050270
§ 371 (c)(1),
(2) Date: Oct. 22, 2015

(87) PCT Pub. No.: WO2014/175737
PCT Pub. Date: Oct. 30, 2014

(65) Prior Publication Data
US 2016/0084453 A1    Mar. 24, 2016

(30) Foreign Application Priority Data

Apr. 25, 2013    (NL) .................................. 2010708

(51) Int. Cl.
*F21L 4/04*      (2006.01)
*F21V 5/00*      (2015.01)
(Continued)

(52) U.S. Cl.
CPC ............... *F21L 4/045* (2013.01); *F16B 1/00* (2013.01); *F16B 47/00* (2013.01); *F21V 5/006* (2013.01);
(Continued)

(58) Field of Classification Search
CPC ... F21L 4/045; F16B 47/00; F16B 2001/0035; F21V 5/006; F21V 14/065; F21V 14/085;
(Continued)

(56) References Cited

U.S. PATENT DOCUMENTS 2,015,928 A    10/1935  Goldstein
4,609,976 A *  9/1986   Geissler ................. F21V 11/08
                                                          362/167
(Continued)

FOREIGN PATENT DOCUMENTS

EP    0 276 830    8/1988
GB    1101389      1/1967
(Continued)

OTHER PUBLICATIONS

International Search Report dated Sep. 23, 2014 for Appln. No. PCT/NL2014/050270.

*Primary Examiner* — Laura Tso
(74) *Attorney, Agent, or Firm* — Pillsbury Winthrop Shaw Pittman, LLP

(57) ABSTRACT

The invention relates to a safety torch. The torch comprises a housing; a light source arranged in a head of the housing, wherein an end of the housing opposite the head forms a handle in which at least one battery system is arranged; and an at least partly translucent light source cover for at least partly covering the light source. The cover is adjustable between a retracted position in which said cover is at least partly retracted in the head of the housing, to emit in use a beam of light, and a protruding position in which the cover is protruding from the housing, at least protruding further from said housing than in said retracted position. The cover is adjustable between said positions by means of an adjusting mechanism comprising two substantially parallel guides (Continued)

arranged in the longitudinal direction of the housing, for adjusting the cover along the guides.

36 Claims, 18 Drawing Sheets

(51) Int. Cl.
| | | |
|---|---|---|
| *F21V 14/08* | (2006.01) | |
| *F21V 17/02* | (2006.01) | |
| *F16B 1/00* | (2006.01) | |
| *F16B 47/00* | (2006.01) | |
| *F21V 14/06* | (2006.01) | |
| *F21V 21/40* | (2006.01) | |
| *F21V 23/04* | (2006.01) | |
| *F21W 111/10* | (2006.01) | |

(52) U.S. Cl.
CPC .......... *F21V 14/065* (2013.01); *F21V 14/085* (2013.01); *F21V 17/02* (2013.01); *F21V 21/406* (2013.01); *F21V 23/0414* (2013.01); *F16B 2001/0035* (2013.01); *F21W 2111/10* (2013.01)

(58) Field of Classification Search
CPC .... F21V 17/02; F21V 21/406; F21V 23/0414; F21W 2111/10
USPC .......................... 362/187, 190, 191, 208, 397
See application file for complete search history.

(56) References Cited

U.S. PATENT DOCUMENTS

| | | | | |
|---|---|---|---|---|
| 4,897,768 A * | 1/1990 | Thul | ..................... | F16M 11/041 362/191 |
| 4,984,141 A * | 1/1991 | Lai | ..................... | F21V 14/045 362/187 |
| 5,012,394 A | 4/1991 | Woodward | | |
| 5,272,606 A | 12/1993 | Blaney | | |
| 5,412,548 A * | 5/1995 | Yee | ..................... | F21L 4/005 362/186 |
| 5,436,815 A * | 7/1995 | Grooms | ................. | F21L 14/026 362/216 |
| 5,440,465 A | 8/1995 | Hasness | | |
| 5,558,430 A | 9/1996 | Booty, Jr. | | |
| 5,560,705 A * | 10/1996 | Shiau | ..................... | F21L 4/005 362/188 |
| 5,588,739 A * | 12/1996 | Nakao | ..................... | F21L 7/00 362/202 |
| 5,735,594 A | 4/1998 | Own | | |
| 5,816,688 A * | 10/1998 | Shui-Shang | ............. | F21L 4/005 362/187 |
| 5,954,420 A | 9/1999 | Smith | | |
| 6,004,008 A * | 12/1999 | Lai | ..................... | F21V 14/045 362/188 |
| 6,334,697 B1 | 1/2002 | Gappelberg et al. | | |
| 6,598,993 B1 * | 7/2003 | Dalton | ..................... | F21L 4/005 362/188 |
| 7,360,920 B2 * | 4/2008 | Dalton | ..................... | F21L 4/027 362/157 |
| 7,473,007 B1 * | 1/2009 | Wang | ..................... | F21L 4/027 362/187 |
| 7,824,062 B2 * | 11/2010 | Ho | ..................... | F21L 4/027 362/188 |
| 8,333,353 B1 | 12/2012 | Silverman et al. | | |
| 9,222,642 B2 * | 12/2015 | Hsu | ..................... | F21V 5/006 |
| 2001/0024367 A1 * | 9/2001 | Shiau | ..................... | F21L 7/00 362/188 |
| 2007/0035944 A1 * | 2/2007 | Dalton | ..................... | F21L 4/027 362/187 |
| 2009/0009991 A1 | 1/2009 | Liu | | |
| 2009/0251078 A1 | 10/2009 | Oh et al. | | |
| 2009/0251893 A1 | 10/2009 | Shiao | | |
| 2010/0053944 A1 | 3/2010 | Yao-Lin | | |
| 2013/0313388 A1 * | 11/2013 | Diatzikis | ................. | F16B 47/00 248/205.6 |

FOREIGN PATENT DOCUMENTS

| | | |
|---|---|---|
| KR | 10-2010-0046747 A | 5/2010 |
| WO | WO 91/00473 A1 | 1/1991 |
| WO | WO 94/06234 | 3/1994 |
| WO | WO 98/20276 A1 | 5/1998 |
| WO | WO 2005/073616 A1 | 8/2005 |
| WO | WO 2007/125392 A2 | 11/2007 |
| WO | WO 2009/023621 A1 | 2/2009 |

* cited by examiner

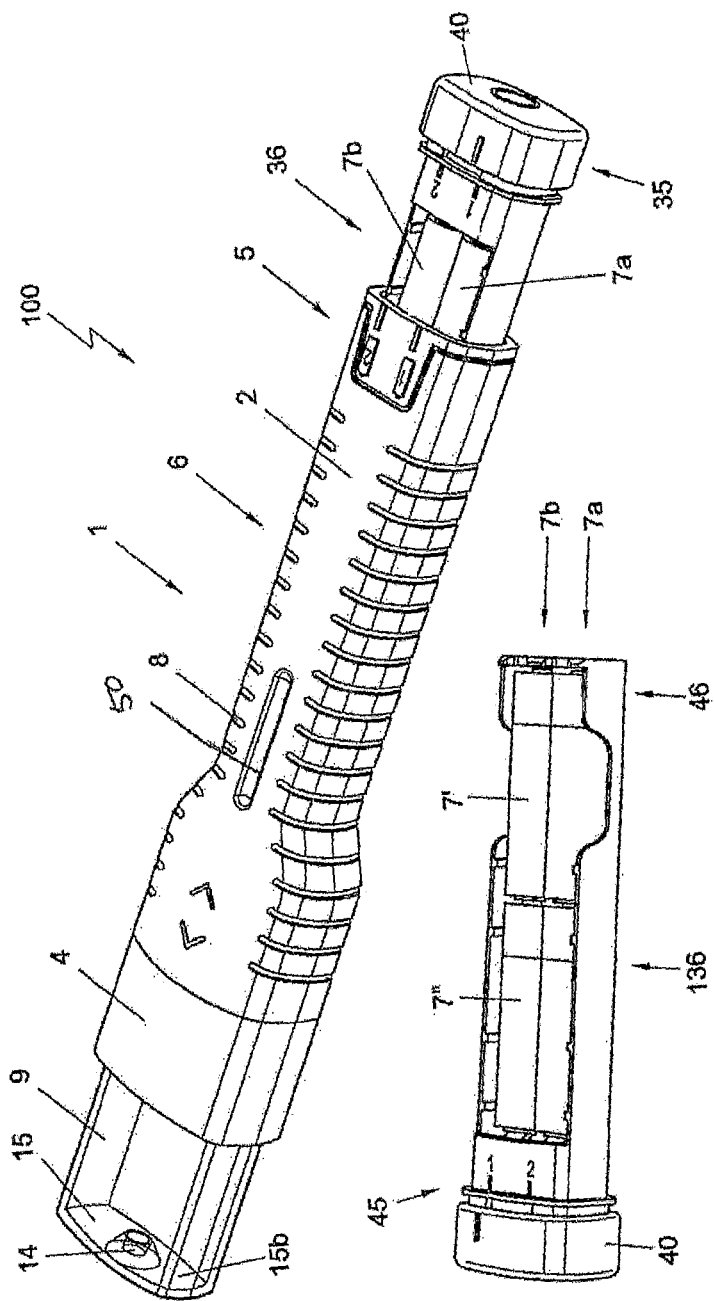

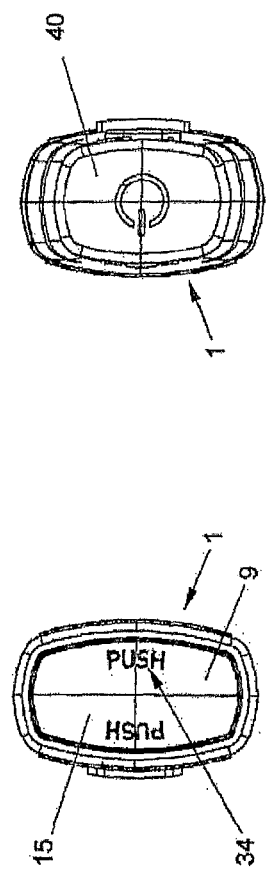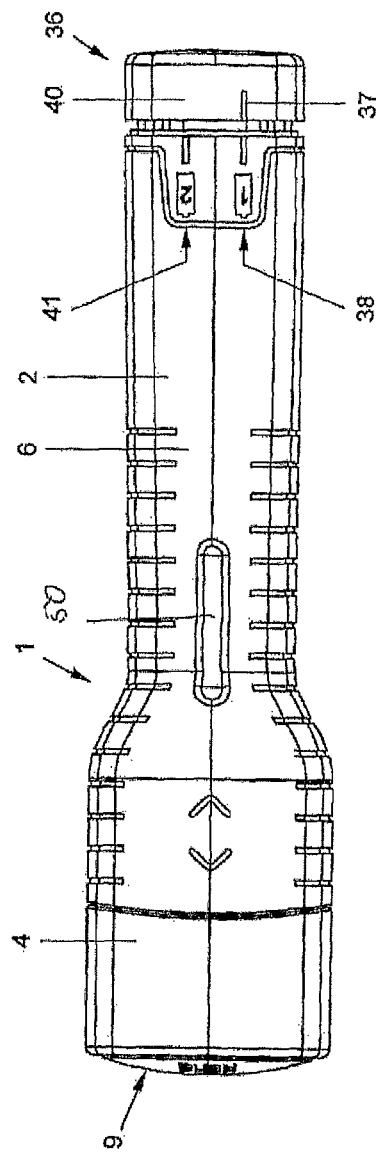

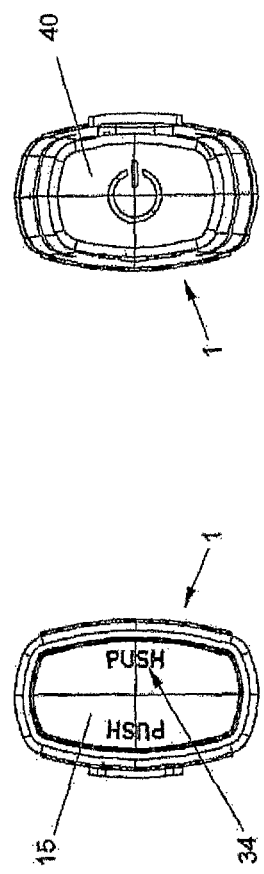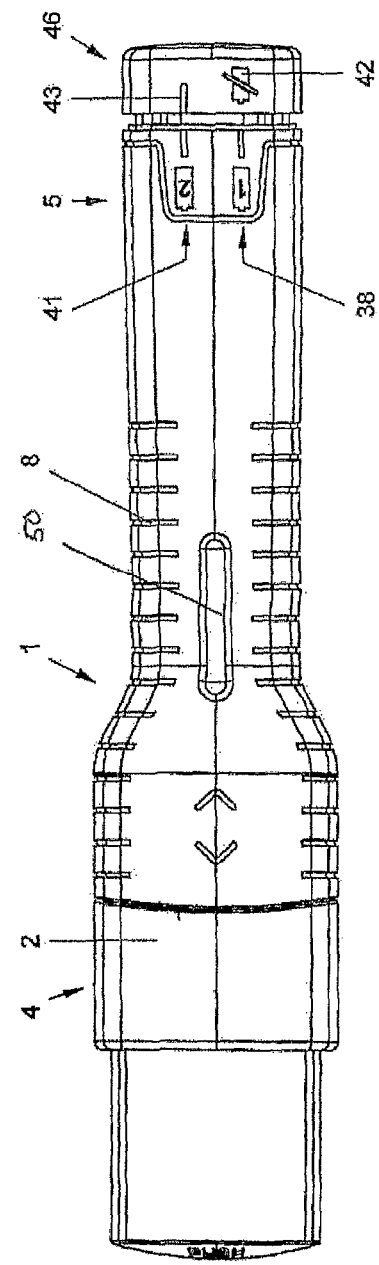

SAFETY TORCH; SET COMPRISING A TORCH AND A CARTRIDGE; HOLDER FOR A SAFETY TOOL

CROSS-REFERENCE TO RELATED APPLICATIONS

This is the U.S. National Stage of PCT/NL2014/050270, filed Apr. 25, 2014, which in turn claims priority to Netherlands Application No. 2010708, filed Apr. 25, 2013, the entire contents of all applications are incorporated herein by reference in their entireties.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE OF ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION

Field of the Invention

Aspects of the invention relate to a torch.

Description of Related Art

Several torches and so-called flashlights may be known. A torch can for instance be used as a portable light source and/or as a back up light source, for example during emergency situations.

Often torches may be stored in a car, such that an emergency light is available when an emergency situation occurs. However, batteries of such torches can run low, for instance due to leakage and/or due to usage of said torch for any illumination or lighting purposes. As a consequence, such known torch may not work at moments when its services may be needed.

Also, conventional torches may not be well suited for signalling and/or for illuminating a space, such as an enclosed space, for example an interior of a vehicle. This can for instance be the case as such conventional torches bundle may emit light into a beam shining substantially in one main direction. Hence, when one is stranded, such as for instance stranded with a broken vehicle, it may be difficult, dangerous and/or even almost impossible to use such known torch for signalling and/or to illuminate the broken vehicle.

Special signalling torches may be often not suitable for providing bundled light for illuminating specific areas, such as can be desirable, for instance when checking a broken engine of a vehicle.

Besides, torches that may be suitable for signalling and/or torches that may be suitable for providing bundled light may not be suitable for illuminating a space, e.g. an interior of a car, relatively uniformly.

Furthermore, a known torch, especially a signalling torch, may often be relatively big, which may be highly undesirable, for example because such torch may therefore not fit into a glove compartment and/or may be difficult to store in a car interior and/or may be difficult to handle with a single hand.

BRIEF SUMMARY OF THE INVENTION

An object of the present disclosure may be to provide a torch that may eliminate at least one of the disadvantages mentioned above or other disadvantage associated with known torches or so-called flashlights. In particular, the invention aims at providing an improved torch. In embodiments, aspects may be providing a torch that is relatively small, relatively reliable and/or relatively versatile. In embodiments, the present invention aims at providing a torch, which is suitable for emitting bundled light and also for signalling and/or relatively uniformly illuminating a space, which torch may also be relatively reliable in view of known torches.

In a first aspect, a torch of the present disclosure provides for a safety torch, comprising: a housing; a light source arranged in a head of the housing, wherein an end of the housing opposite the head forms a handle in which at least one battery system is arranged; and an at least partly translucent and/or transparent light source cover for at least partly covering the light source, wherein the light source cover is adjustable between a retracted position in which said cover is at least partly retracted in the head of the housing, to emit in use a beam of light, and a protruding position in which the cover is protruding from the housing, at least protruding further from said housing than in said retracted position, wherein the light source cover is adjustable between said positions by means of an adjusting mechanism, wherein the adjusting mechanism comprises two substantially parallel guides arranged in the longitudinal direction of the housing, for adjusting the light source cover along the guides.

By making the light source cover adjustable between the retracted position and a protruding position, the torch can be relatively versatile. In the retracted position the torch is namely relatively small and may be relatively well to handle with, preferably, a single hand. Moreover, in the retracted position, the torch can be used relatively well for illuminating a certain area, for instance because it may be arranged for bundling light into a bundle or beam when in said retracted position, whereas the torch in its protruding position can be used for signalling and/or for relatively uniformly illuminating a certain space or room. In said protruding position, light may namely emit from the cover at multiple sides, e.g. through a distal end surface and also through one or more sidewalls or side surfaces. It is noted that the torch may be arranged to be employed at least as a hand-held spotlight, especially when in its retracted position, whereas the torch may also be arranged to be employed at least as a hand lantern or other portable lighting device suitable for illuminating relatively broad areas and/or for signalling, especially when in its protruding position.

By providing the two substantially parallel guides arranged in the longitudinal direction of the housing, the cover can be guided relatively well. For instance, due to said two substantially parallel guides, it can be counteracted that the cover skews. Hence, a relatively reliable torch can be provided for.

In a further aspect of the present invention, the safety torch comprises a housing, a light source arranged in a head of the housing, and an at least partly translucent light source cover for at least partly covering the light source, wherein an end of the housing opposite the head forms a handle arranged for housing a primary battery system and a secondary battery system; and wherein the safety torch further comprises a circuit switch arranged to be brought from a first position, in which the primary battery system can feed the light source and the secondary battery system is interrupted from feeding the light source, into a second position, in which the secondary battery system can feed the light source and the primary light source is interrupted from feeding the light source, wherein the safety torch further comprises a battery system cartridge arranged for accommodating the primary battery system and the secondary battery system, said cartridge being removably insertable into the handle.

By providing the torch with both said primary and secondary battery system and with said circuit switch, battery energy will be available during use. This, because even when the user is taken by surprise by the first battery system running low, said user may switch to the other battery system, which is preferably charged. Such switching may be relatively easily, especially when compared to removing and replacing batteries in a known torch, which can be relatively cumbersome and may often requires unscrewing and screwing back a battery cap. Hence, by providing both battery systems, the user can postpone replacing or recharging the battery or batteries of the first battery system until a more suitable moment.

By providing the battery system cartridge, batteries can be replaced relatively easily. For example, it may be handy that multiple battery systems and/or multiple batteries can be replaced in one go.

The battery system may be considered as a separate invention.

In another embodiment, the safety torch may further be provided with a connecting element for removable connection to a holder. For example, the housing of the safety torch can specifically be designed for connection to a holder, or the housing can have a specific provision, such as a groove or a pin or a click finger etc., for connection with a holder.

Further aspects of the invention may involve a holder for holding the torch and/or a safety hammer and/or a safety tool and/or other tools of the applicant.

In an embodiment, a holder may comprise a base holder element and at least one intermediate holder element arranged for removable coupling to the base holder element at one end and for removable coupling to a safety tool at another end; wherein the intermediate holder element is provided with a single connecting element for removable connection to the safety tool.

In another embodiment, a holder may comprise an elongated strip that may be provided with at least one suction cup, or in another embodiment, of which both ends may be provided with a suction cup. The suction cups may be provided at one side of the strip, at an other side of the strip a connecting element for connection to the safety tool may be provided. The connecting element may be a single connecting element, e.g. positioned approximately in the center of the length of the strip, and/or two connecting elements may be provided, e.g. each connecting element may be provided at an end of the strip and/or multiple connecting elements may be provided for removable connecting the strip to the tool.

In another embodiment, each suction cup may be provided with a magnet.

In use, the elongated strip may be connected to the safety tool such that the strip may be more or less in line with the longitudinal direction of the safety tool.

By providing a holder which may be provided with suction cups at one side and with a connecting element at another side, the safety tool may be attached to glass and/or metal surfaces. Glass and/or metal surfaces may be in and/or on the vehicle, but may also be elsewhere, e.g. in offices, buildings, homes, buses, trucks, vans, etc.

By providing the suction cups at both ends of the strip, a stable attachment to the surface may be provided.

In an embodiment, the strip may be foldable. In one position, the strip may be elongated. In another position, the strip may be folded with both ends positioned over each other. In the folded position, the connecting element for connecting to the safety tool may be left free such that the strip also in folded position may be connectable to the tool. The holder may be considered as a separate invention.

An aspect of the invention may also relate to a set comprising a safety torch including a first battery system cartridge and also an additional cartridge.

Advantageous embodiments according to the invention are described in the appended claims.

BRIEF DESCRIPTION OF THE SEVERAL VIEWS OF THE DRAWINGS

By way of non-limiting example only, embodiments of the present invention will now be described with reference to the accompanying figures in which:

FIG. 1 shows a schematic perspective view of an embodiment of a set comprising a safety torch according to an aspect of the invention and an additional battery system cartridge;

FIG. 2b shows a schematic perspective bottom view of the safety torch of FIG. 2a;

FIG. 2c shows a schematic front view of the safety torch of FIGS. 2a-2b;

FIG. 2d shows a schematic top view of the safety torch of FIGS. 2a-2c;

FIG. 2e shows a schematic rear view of the safety torch of FIGS. 2a-2d;

FIG. 3b shows a schematic perspective bottom view of the safety torch of FIG. 3a;

FIG. 3c shows a schematic front view of the safety torch of FIGS. 3a-3b;

FIG. 3d shows a schematic top view of the safety torch of FIGS. 3a-3c;

FIG. 3e shows a schematic rear view of the safety torch of FIGS. 3a-3d;

DETAILED DESCRIPTION OF THE INVENTION

The embodiments disclosed herein are shown as examples only and should by no means be understood as limiting the scope of the claimed invention in any way. In this description, the same or similar elements have the same or similar reference signs.

For the purpose of clarity and a concise description features are described herein as part of the same or separate embodiments, however, it will be appreciated that the scope of the invention may include embodiments having combinations of all or some of the features described.

FIG. 1 shows a schematic perspective view of a set 100 according to an aspect of the invention. The set 100 comprises a safety torch 1 according to an aspect of the invention. Besides the set comprises an additional battery system cartridge 136.

It is noted that a safety torch 1 according to the invention does not need to, but may nevertheless, be part of such set 100. In embodiments, the torch 1 may thus be provided separately.

Figure 2A:
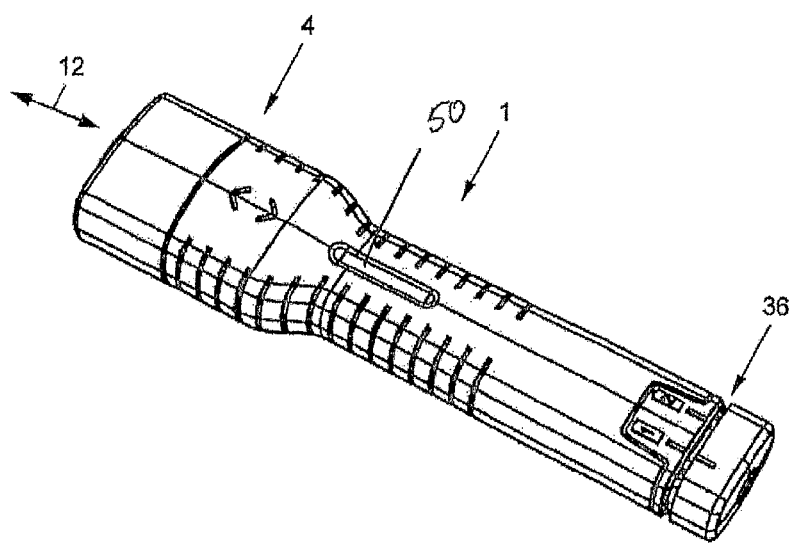
FIG. 2a shows a schematic perspective top view of an embodiment of a safety torch in a first position.
Figure 2B:
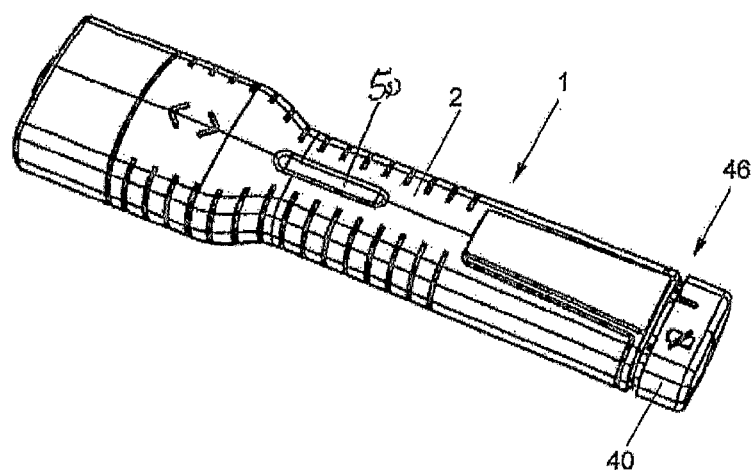
Figure 2F:
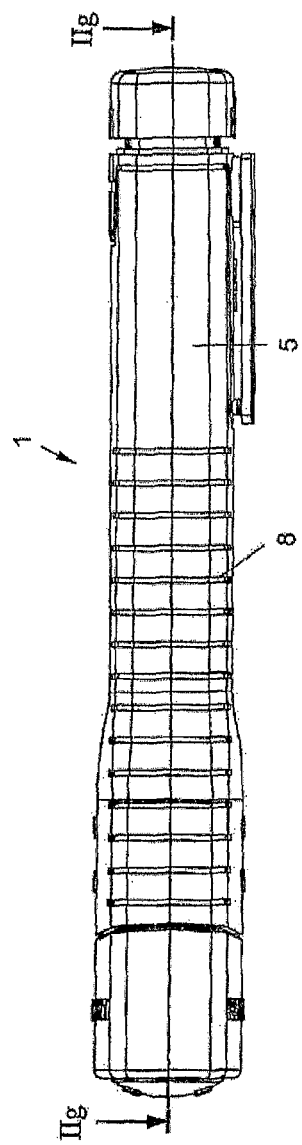
FIG. 2f shows a schematic side view of the safety torch of FIGS. 2a-2e.
Figure 2G:
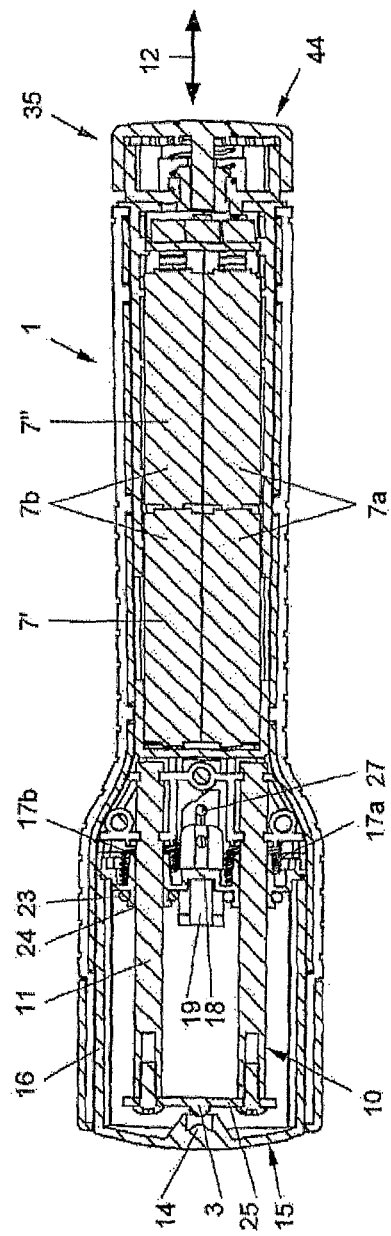
FIG. 2g shows a cross-sectional view of the safety torch of FIG. 2f along line 2g.
Figure 3A:
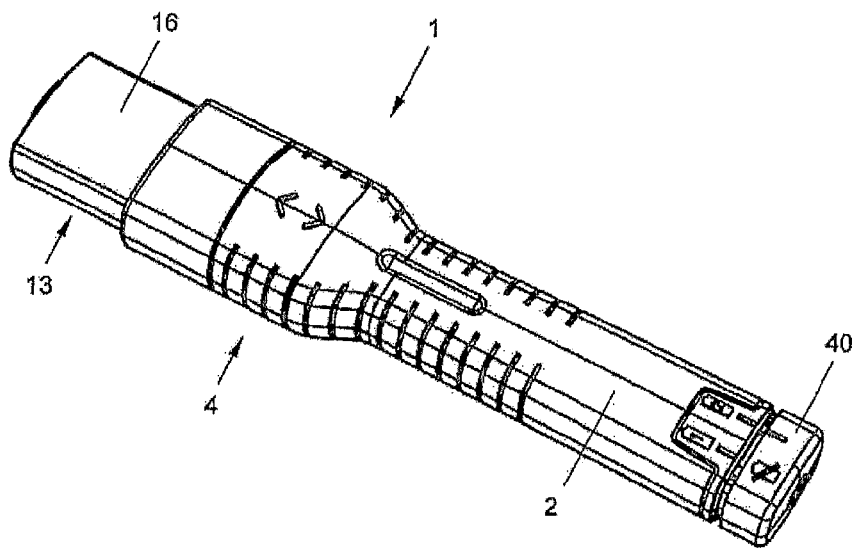
FIG. 3a shows a schematic perspective top view of the safety torch of FIGS. 2a-2g in a second position.
Figure 3B:
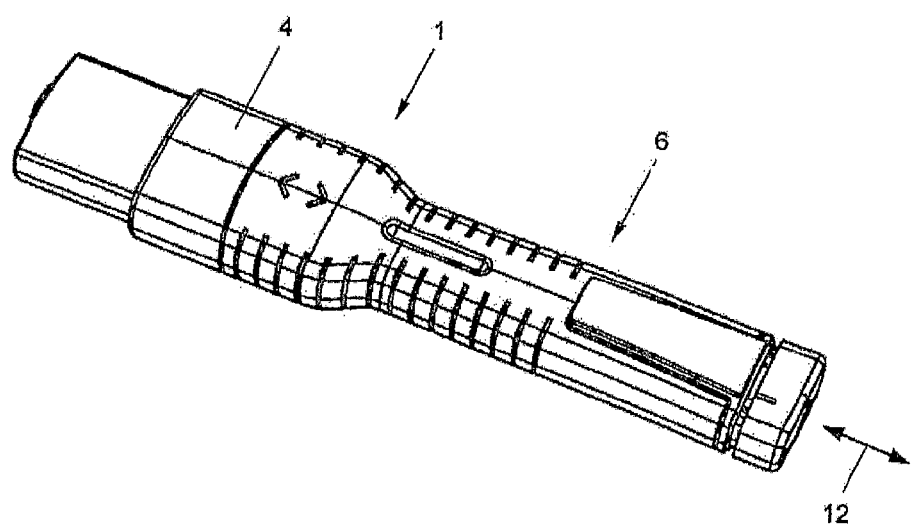
Figure 3F:
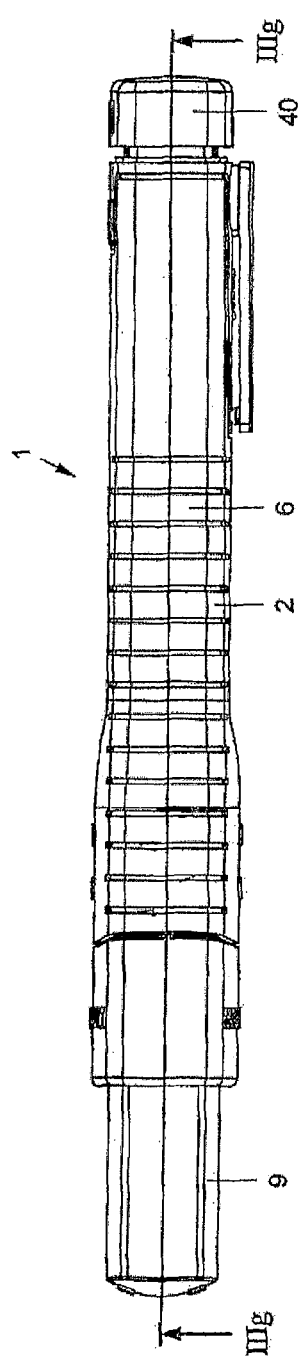
FIG. 3f shows a schematic side view of the safety torch of FIGS. 3a-3e.
Figure 3G:
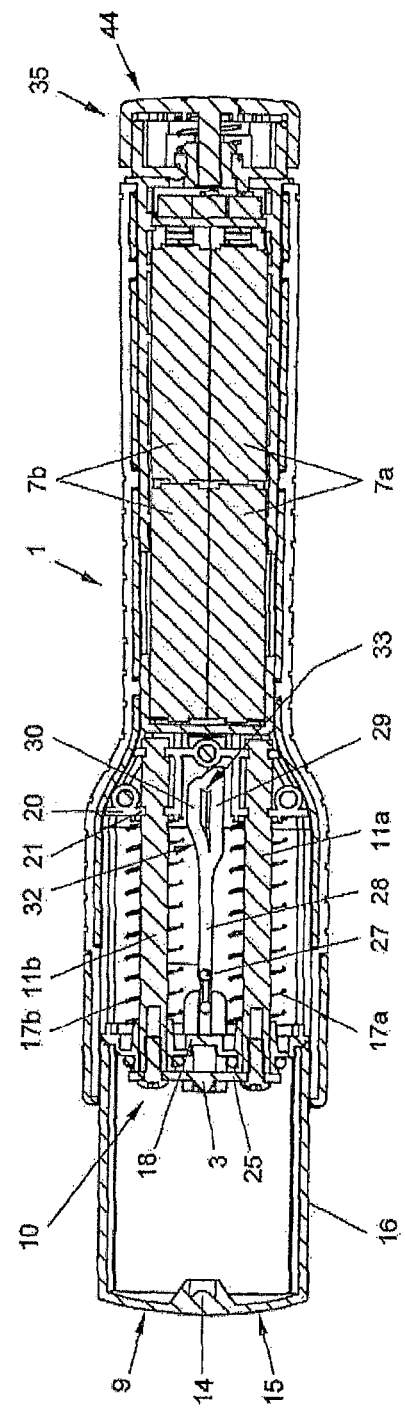
FIG. 3g shows a cross-sectional view of the safety torch of FIG. 3f along line 3g.

FIGS. 2a-2g show multiple views of a safety torch 1 according to an aspect of the invention in a first position. FIG. 2a shows a schematic perspective top view of the torch, FIG. 2b shows a schematic perspective bottom view, FIG. 2c shows a schematic front view, FIG. 2d shows a schematic top view, FIG. 2e shows a schematic rear view, FIG. 2f shows a schematic side view, and FIG. 2g shows a cross-sectional view. It is noted that the safety torch 1 is a portable lighting device 1 or so-called hand-held lighting device 1 and can be a so-called flashlight 1, hand lantern, portable lamp or hand-held portable light source. The safety torch can be arranged to be handled with one or two hands and/or to be carried by hand. The torch 1 may for instance comprise one or more handles, which may be formed by a part of a housing of the torch and/or may be formed differently, for instance as a separate handle. Additionally or alternatively, the torch 1 can comprise one or multiple grip areas for facilitating gripping, handling and/or carrying said torch. In embodiments, operating means of the safety torch, such as switches, buttons and/or setting means, can preferably be designed such that they can be operated manually.

In this embodiment, the safety torch 1 comprises a housing 2 and a light source 3 arranged in a head 4 of the housing 2. Here, a LED forms the light source 3. However, in alternative embodiments, the light source 3 can be formed by a light bulb, a halogen lamb or by any suitable other means. It is noted that the torch 1 can also comprise more than one light source 3, for example the torch 1 can comprise multiple light sources each arranged for emitting a different colour of light. Here, an end 5 of the housing 2 opposite the head 4 forms a handle 6 in which at least one battery system 7 is arranged. It is noted that the handle 6 can comprise multiple battery systems 7a, 7b, for example at least a primary battery system 7a and a secondary battery system 7b. Additionally or alternatively, the battery system 7 can comprise one or multiple batteries 7', 7", preferably multiple batteries 7', 7" in series. Here, each battery system comprises two batteries. However, a battery system can comprise another number of batteries, for instance one, three or four batteries. Moreover, in embodiments, the torch may comprise battery systems, which have different number of batteries with respect to each other.

Although in the embodiment shown here, the handle 6 is provided with a grip area having gripping means, the handle does not necessarily need to comprise such area. If a grip area is present, it may for example be provided with protrusions and/or indentations 8, such as grooves 8. Alternatively or additionally, the grip area may comprise a relatively rough material, such as a rubber material. Typically the handle 6 is intended to be held by a single hand of a user.

Figure 4:
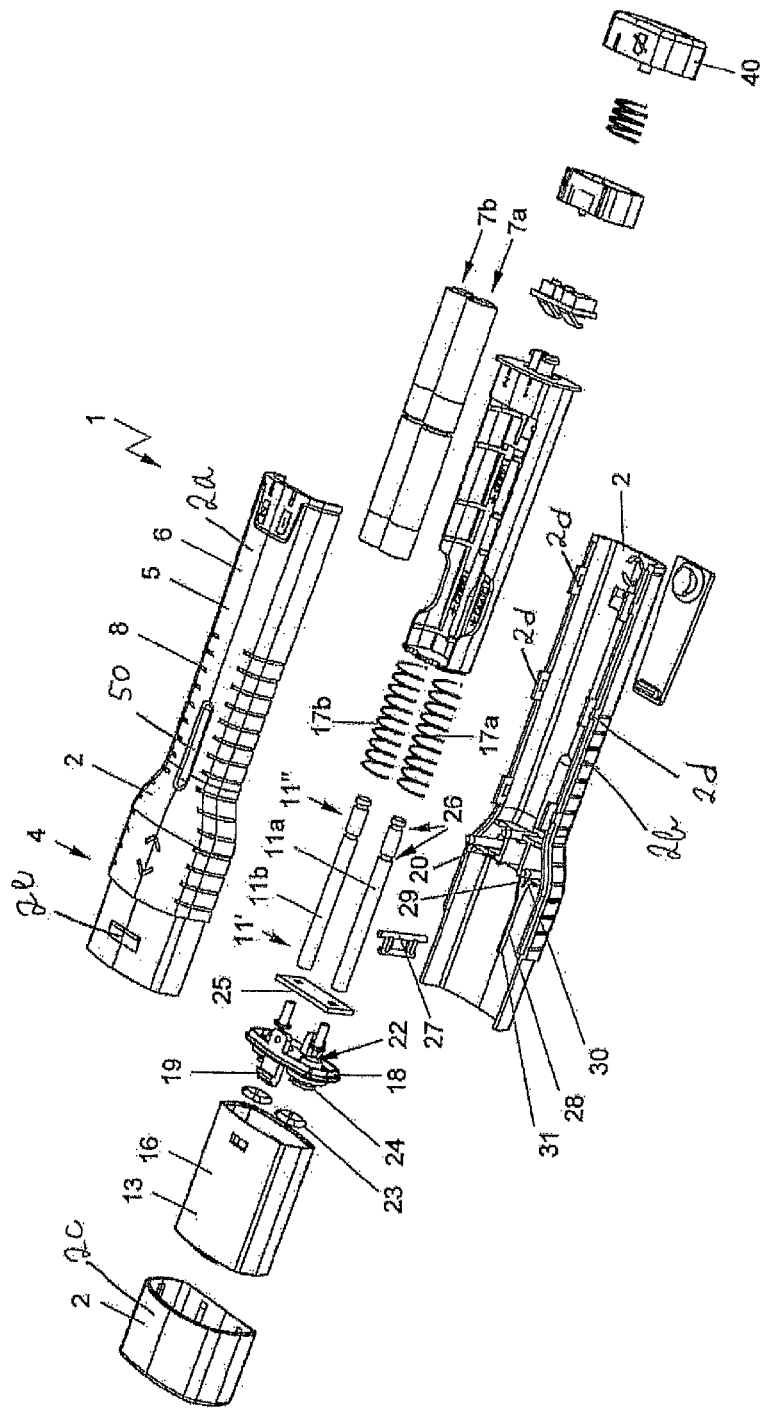
FIG. 4 shows a schematic perspective exploded view of the safety torch of FIGS. 2a-2g and 3a-3g.

The housing 2 of the safety torch 1 may be provided with a connecting element 50. In the embodiment shown, the connecting element 50 is provided as a recess 50. The recess 50 is a connecting element arranged for removable connection with a holder. The connecting element 50 is in this embodiment arranged as a groove. Other embodiments of the connecting element may be provided, such as a click-connection or a pin connection or a bayonet connection or a hook connection etc. Many variants are possible. In the embodiments shown, the housing 2 may comprise multiple parts. In the embodiment of FIG. 4 the housing 2 comprises three parts, a first shell part 2a, a second shell part 2b and a head part 2c. The different parts may be relatively easily assembled to form the housing 2. For example, in the embodiment of FIG. 4 click fingers 2d are shown to provide for a click connection between the first and the second shell parts 2a, 2b. Also, in the embodiment of FIG. 4, a click finger 2e is shown to provide for connection of the head shell part 2c with the shell parts 2a, 2b. Each shell part 2a, 2b may be provided with such a click finger 2e to connect with the head part 2c. Alternatively and/or additionally, other elements and/or other methods of assembling the housing parts 2a, 2b, 2c together may be provided. For example, a fastening connection comprising screws and/or bolts and/or a glue connection and/or a bayonet connection and/or pin connection and/or a hook connection, as well as many other variants, may be possible.

Figure 5:
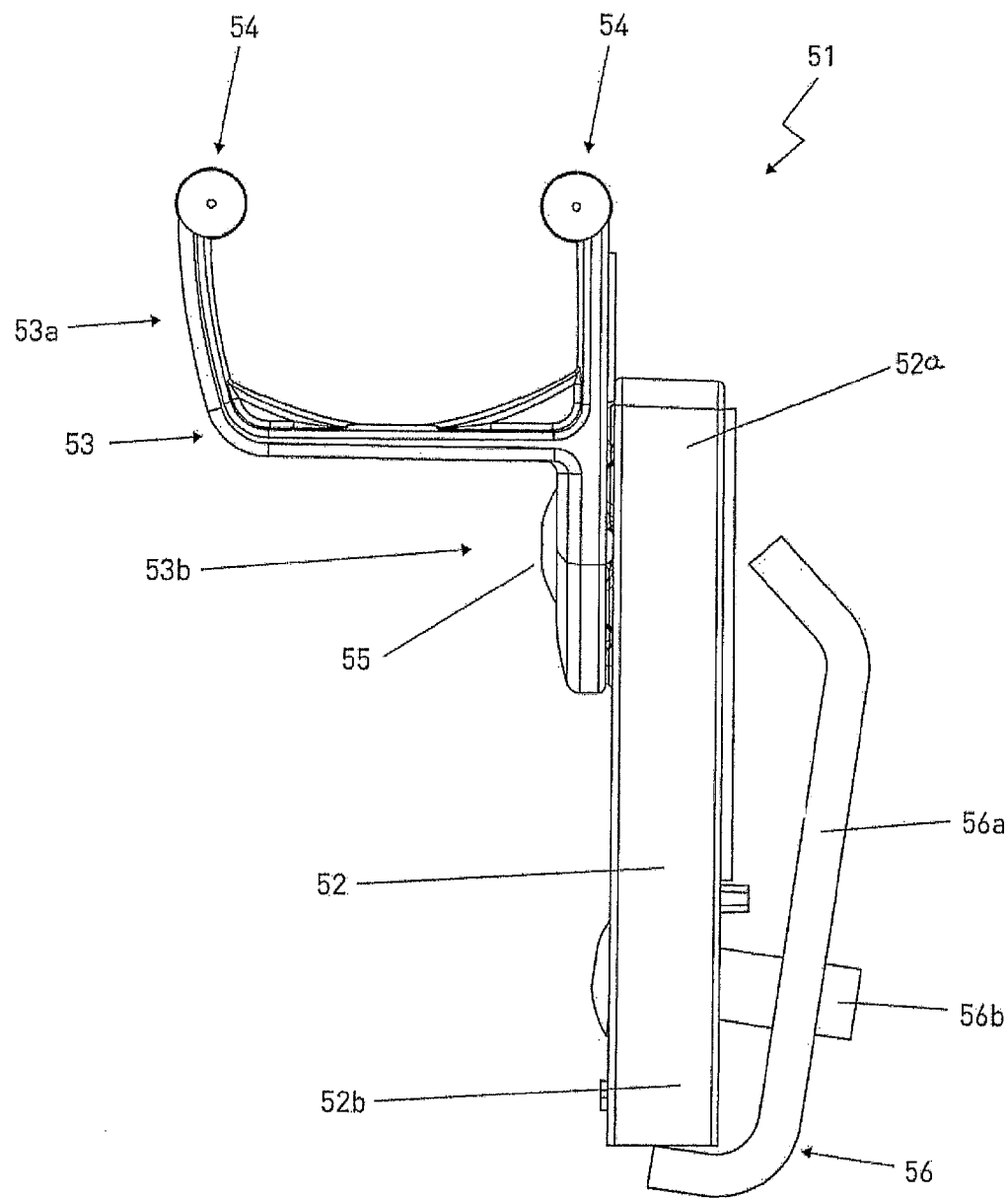
FIG. 5 shows a schematic side view of a first embodiment of a holder.
Figure 6:
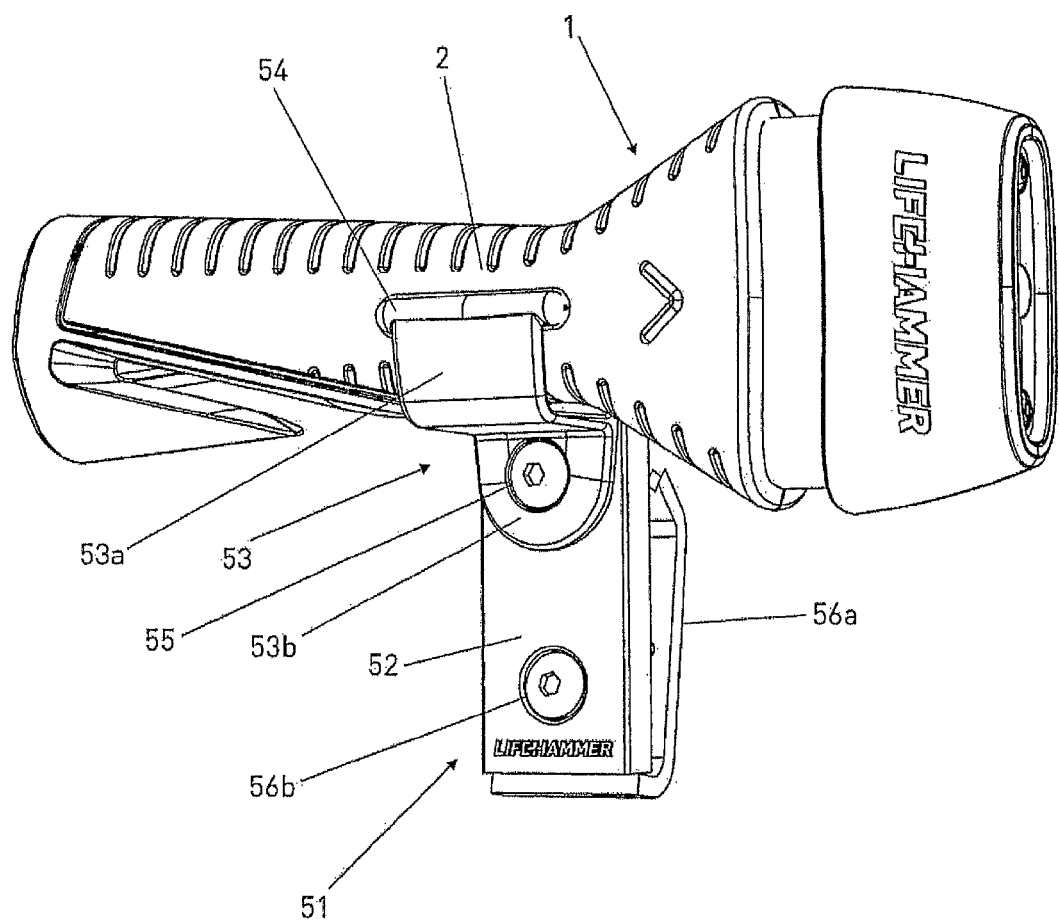
FIG. 6 shows a schematic perspective view of a set of a safety tool with the holder of FIG. 5.
Figure 7:
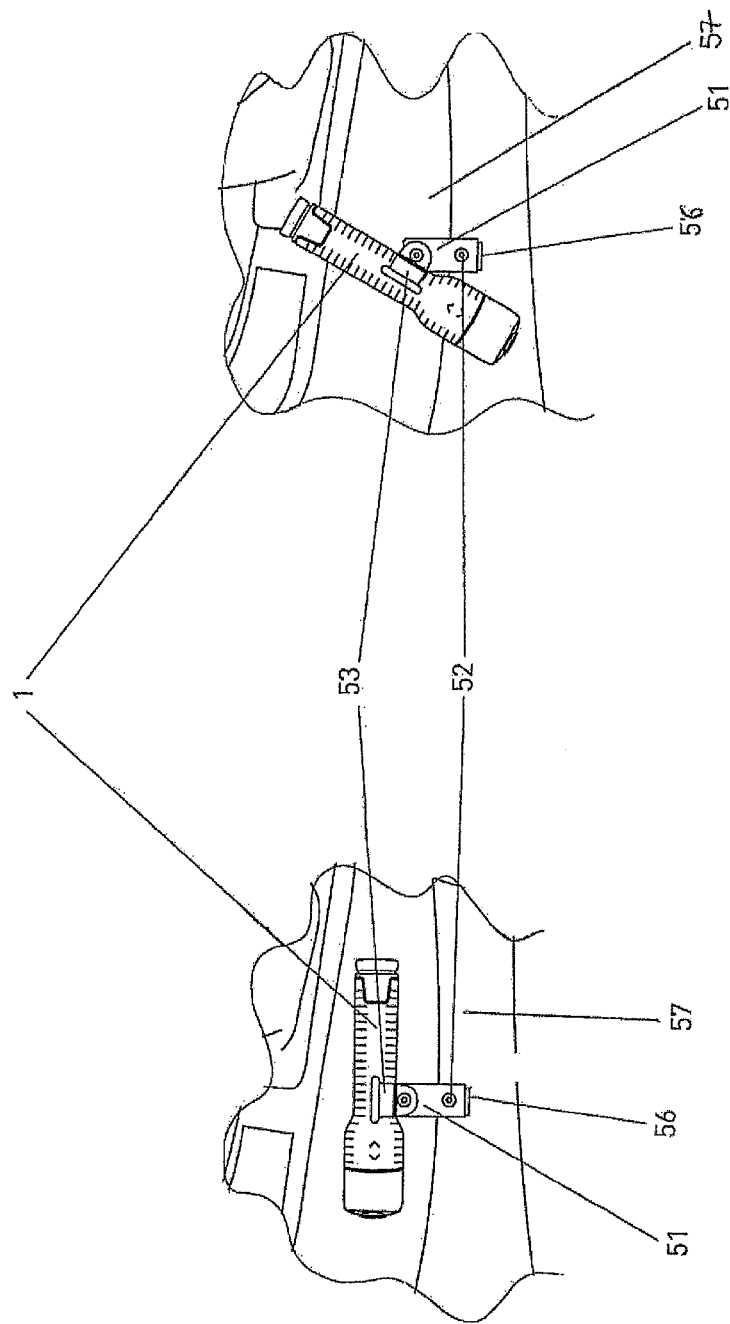
FIG. 7a shows a schematic view of an arrangement of a set of a safety tool with the holder in a vehicle interior wherein the intermediate holder element is positioned in line with the base holder element.
FIG. 7b shows a schematic view of an arrangement of a set of a safety tool with the holder in a vehicle interior wherein the intermediate holder element is positioned in line with the base holder element.

In an embodiment, the housing 2 may comprise at both sides, e.g. both the first shell part 2a and the second shell part 2b, a connecting element 50 for removable connection to a holder. An embodiment of a holder is shown in FIGS. 5-7 and in FIGS. 8-14.

The safety torch 1 of the present embodiment comprises an at least partly translucent light source cover 9 for at least partly covering the light source 3. It is noted that in this description translucent has to be understood as at least including but not necessarily limited to being substantially transparent. Besides, translucent may include being of scattering nature. Alternatively or additionally, a translucent element can be coloured, for instance it can comprise a colour filter and be translucent nevertheless. In the current embodiment, the light source cover 9 is adjustable, for instance slidable, between a retracted position, shown in FIGS. 2a-2g, in which position said cover 9 is at least partly retracted in the head 4 of the housing 2, to emit in use a beam of light, and a protruding position, shown in FIGS. 1 and 3a-3g, in which position the cover 9 is protruding from the housing 2, at least protruding further from said housing 2 than in said retracted position. The light source cover 9 is adjustable between said positions by means of an adjusting mechanism 10, wherein the adjusting mechanism comprises two substantially parallel guides 11 arranged in the longitudinal direction 12 of the housing 2, for adjusting the light source cover along the guides 11. Here, guiding rods 11, which are preferably extending at least partly through the head 4 of the housing 2, form the guides 11. However, in alternative embodiments, the guides 11 may be formed differently, for instance by means of rails or tooth racks provided at an inner surface of said head 4.

Here, the light source cover 9 is of substantially tubular design 13 and comprises a lens 14 at a distal end face 15 of the tubular shape 13 and further comprises an at least partly translucent and/or transparent sidewall 16. Here, the tubular shape has a substantially rectangular cross-section. However, in embodiments, the tubular shape may have another cross-section, such as for instance a substantially round, elliptical or triangular cross-section. Advantageously, the lens 14 may be an optical lens 14, which may be arranged for transforming light emitted by the light source 3, especially transforming it by at least partly bundling or focussing said light.

In embodiments, the light source cover 9 is adjustable along the guides 11 against a biasing force of a resilient element 17 that biases the cover 9 towards one of the positions, especially towards the extended position, shown in FIGS. 1 and 3a-3g. However, in alternative embodiments, the resilient element 17 may be arranged for biasing the cover 9 towards the retracted position, shown in FIGS. 2a-2g.

The light source cover 9 can be connected to a cover base 18 for supporting the light source cover 9. Said cover base 18 can be arranged for cooperation with the guides 11 for moving said base 18 along the guides 11 between the retracted and extended position.

Preferably, the cover base 18 is removably connected to the cover 9, for example by means of click fingers 19. However, alternatively, the base and the cover may be connected unreleasably or may be removably connected by other means, e.g. by means of screws or the like.

The resilient element 17 can comprise a spring 17a arranged around one of the guides 11a. Additionally, the torch 1 may comprise a second resilient element 17b comprising a second spring 17b arranged around the other guide 11b. Like in the embodiment shown, the spring 17 can be a compression spring 17, preferably for biasing the cover 9 towards the extended position. However, the spring 17 may alternatively be a tension spring and/or the torch 1 may be arranged such that the spring is for biasing the cover 9 towards the retracted position. The spring 17 may be a metal spring or may be a plastic spring, may be a zig-zag spring, or may be a spring extending around a guide. Various embodiments of the resilient element may be possible.

Advantageously, a first end of the spring 17 may rest against and/or may be attached to the cover 9 or the cover base 18. The other end of the spring 17 may rest against and/or may be attached to the housing 2, for instance against a part thereof such as a reinforcement rib 20 and/or a retaining means 21 for retaining the guide 11 in its place.

The light source cover 9, preferably its cover base 18, can comprise two cooperating elements 22, such as openings 22 or recesses, to cooperate with the two guides 11a, 11b for moving the base 18 along the guides 11 between the retracted and extended position. Here, the cooperating elements 22 are formed by openings 22 shaped as relatively elongated channels, which may slide relatively well along the guides 11 and/or may counteract skewing of the cover 9 during its movement.

In embodiments, the torch 1 can comprise at least one restriction element 23 to slow down the movement of the cover 9 along the guides 11. Consequently, the movement of the cover 9 from one position to the other position, preferably form one position to the position to which the spring or springs 17 biases the cover 9, can be slowed down to some degree. For example, the restriction element 23 may be for slowing down moment from the retracted position towards the protruding position. The restriction element 23 may be placed at least partly around the respective guide 11. For instance, the restriction element 23 can be formed by a washer or a rubber ring 23. Such washer or rubber ring 23 may be provided at the cover 9, preferably at the cover base 18, and may be at least partly in frictional contact with one of the guides 11 and/or an inner surface 24 of the housing 2, preferably an inner surface 24 of the head 4 of said housing 2, in order to slow down the movement of the cover 9. Additional or alternatively, the washer or rubber ring 23 or other restriction element 23 may be arranged such that it pushes or pulls another element 24, e.g. an at least partly compressible sleeve 24, which may thereto for instance be provided with one or more splits. Additionally or alternatively, the restriction element 23 may be integrated to the cover base 18.

Further, a bridge part 25 can be provided between the two guides 11. Here, the bridge part 25 is provided at or near distal ends 11' of said guides. The bridge part 25 may for instance provide some stability to the guides. In this context, it is noted that the guides 11 may be mounted to the housing 2, preferably mounted substantially immovably in at least their longitudinal direction. Thereto, the respective guide 11 may be mounted with its proximal end 11" to the housing, preferably to an inside of the head 4. Here, the guide 11 comprises coupling means 26 formed as grooves 26 for cooperation with retaining means 21 provided inside the housing 2. However, the guide may comprise other coupling means 26 and/or may be mounted to the house 2 by other means, such as for instance by means of gluing or welding.

In embodiments, the light source 3 can be provided at the bridge part 25. Preferably, the light source 3 can be in electrically conductive connection with both guides 11a, 11b, such that said light source 3 can be brought in electric connection with a respective battery system 7a, 7b via said two guides 11. It is noted that the light source 3 can thus be positioned substantially stationary in the housing. This is, the light source 3 does then not move together with the light source cover 9 during movement of the latter relative to the housing 2. Advantageously, the guide 11, or at least a part thereof, such as a conduction strip, is arranged for conducting electrical energy. The guide or the part thereof may for instance be made of a conductive material, preferably a metal or metal alloy such as being or comprising brass, copper, aluminium and/or stainless steel.

Advantageously, the guides 11 are electrically connected to the respective at least one battery system 7. Thereto, the proximal ends 11" of the guides 11 may for instance extend into a space inside the handle 6 in order to contact a battery system 7 directly or indirectly, e.g. via electrically conductive connection elements.

As best can be seen in FIGS. 3a-3g, which show multiple views of the safety torch of FIGS. 2a-2g in a second position, and in FIG. 4, which shows a schematic perspective exploded view of the safety torch of FIGS. 2a-2g and 3a-3g, the adjusting mechanism 10 can comprise or can be formed by a push-push mechanism 10 for adjusting the cover 9. For example, the push-push mechanism 10 can comprise a pin 27 that is movable in a groove 28 provided at an inner side of the housing 2. In an advantageous embodiment, the groove 28 provides for a first path 29 along which the pin 27 is movable when adjusting the cover 9 from the retracted position to the extended position and a second path 30 along which the pin 27 is movable when adjusting the cover 9 from the extended position to the retracted position. Here, as best can be seen in FIGS. 3a-3g, the groove 28 has a distal end 31, which forms a stop 31 for the pin 27. When the springs 17 move the cover 9 towards the protruding position, the groove 28 guides the pin 27 until it runs into the stop 31. Then, said stop 31 counteract that the cover can move further outwards of the head 4 of the housing of the safety torch 1. By means of the outwardly pushing springs 17, the cover 9 is hold in said protruding position. When a user of the torch 1 pushes on the cover 9, preferably on its distal end face 15, the force of the springs can be overcome and the cover 9 can be moved inwards the head 4. The pin 31 is then guided by the groove 28 and will run into a control surface 32, which steers the pin 31 that is hingedly connected to the cover 9 aside into the second path 30. When the cover 9 is pushed far enough into the head 4, the user can release the cover 9, which then is pushed back in the outward direction by the springs. However, since the groove 28 is provided with a receiving surface 33 near the proximal end of the groove 28, the pin 31 can be caught by said receiving surface 33, thereby preventing the cover 9 from moving further outwards and therefore keeping the cover 9 in the retracted position. In order to subsequently move the cover 9 into the protruding position, the user can again push on the cover 9. The cover 9 is then moved inwardly to such extent that the pin 31 moves out of the receiving surface 33 and moves into a second control surface 34, which steers the pin 31 sideways, such that said pin 31 will not be caught by the receiving surface 33 when the user stops pushing the cover 9 and the springs 17 move the cover outward. Instead of being caught by said receiving surface 33, the pin 27 now moves along the first path 29 and the cover 9 moves outward until it arrives in the retracted position.

It is noted that the light source cover 9 itself may thus form a push button for changing the position of said cover 9. In embodiments, the cover 9, preferably its distal end face 15, may be provided with a use cue 34, for instance a use cue in the form of visible and/or tactile information 34, such as the word "push" 34 or the like.

It is noted that the cover 9 can be provided with an integrated lens 14, preferably at a distal end face 15 of said cover. Such integrated or other lens may be arranged for transforming light emitted by the light source 3, especially at least partly bundling or focussing said light. Hence, the safety torch 1 can be used for specifically illuminating certain areas. The distal end face 15 can be at least partly transparent.

Alternatively or additionally, the cover 9 can comprise one or more side surfaces or sidewalls 16 which are at least partly translucent, for example transparent. Advantageously, said side surface 16 or side surfaces is/are arranged for scattering light emitted by the light source 3. Hence, the torch 1 may for instance be used for diffuse illumination, for example for overall and/or relatively uniformly illuminating of an interior of a car. Additionally, also parts of the end face 15, especially parts 15b located aside of and/or around the lens 14, may be arranged for scattering light emitted by the light source 3.

In embodiments, such as for instance the embodiments shown in FIGS. 1-4, a safety torch 1 according to the present disclosure comprises a housing 2, a light source 3 arranged in a head 4 of the housing 2, and an at least partly translucent light source cover 9 for at least partly covering the light source 3. In said embodiment, an end 5 of the housing 2 opposite the head 4 forms a handle 6 arranged for housing a primary battery system 7a and a secondary battery system 7b. It is noted that the torch 1 may nevertheless comprise more than two battery systems. Further, said safety torch 1 comprises a circuit switch 35 arranged to be brought from a first position, in which the primary battery system 7a can feed the light source 3 and the secondary battery system 7b is interrupted from feeding the light source 3, into a second position, in which the secondary battery system 7b can feed the light source 3 and the primary light source 7a is interrupted from feeding the light source 3. Besides, the safety torch 1 further comprises a battery system cartridge 36 arranged for accommodating the primary battery system 7a and the secondary battery system 7b. Said cartridge 36 is removably insertable into the handle 6. The primary and secondary battery system 7a, 7b may also be incorporated in safety torches 1 with a different housing 2 and/or light source 3 and/or head 4 and/or handle 2.

Advantageously, the circuit switch 35 can be a manual switch. Here, the circuit switch 35 is comprised in a operating knob 40 that can be turned in order to switch between the first position in which the primary battery system 7a can feed the light source 3 and the secondary battery system 7b is interrupted from feeding the light source 3, and the second position, in which the secondary battery system 7b can feed the light source 3 and the primary light source 7a is interrupted from feeding the light source 3. For example, the torch 1 can be provided with one or more use cues 37 for indicating which of the battery systems 7a, 7b is able of feeding the light source 3 at that moment. In FIGS. 2a-2g, a first use cue 39 is positioned near a second use cue 38 that corresponds to the first battery system 7a in order to indicate that the first battery system 7a is connected to the light source 3 at that moment. In FIGS. 3a-3g, the knob 40 is turned with respect to its position in FIG. 2, such that the second battery system 7b is then connected to the light source 3. In FIGS. 3a-3g, a third use cue 43 is then located close to a fourth use cue 41 that corresponds to the second battery system 7b, thereby said use cues are indicating that the second battery system 7b is then connected to the light source 3. Moreover, a further use cue 42 is then located close to the second use cue 38 that corresponds to the first battery system 7a in order to indicate that said first battery system 7a is at that moment interrupted from feeding the light source 3.

It is noted that the housing 2 of the torch 1, especially its handle 6 can be arranged for receiving the cartridge 36 in a holding position in which said cartridge 36, especially its first or second battery system 7a, 7b, is in electrical connection with electrically conductive parts of the torch provided inside the housing 2 of said torch 1. It is noted that such electrically conductive parts may for instance be formed by proximal ends 11" of the guides 11.

Further, it is noted that each battery system 7a, 7b can comprise one or multiple batteries. When a battery system comprises multiple batteries, said batteries 7', 7" are preferably in series. Alternatively or additionally, the batteries can be rechargeable batteries.

Advantageously, the battery or batteries 7', 7" of the battery systems 7a, 7b may be removable from the cartridge 36. However, in alternative embodiments, the battery or batteries of the battery systems may not be removable. The cartridge 36 may for instance be arranged such that the batteries can be recharged while being inside said cartridge 36.

In embodiments, the safety torch 1 can further comprise a control switch 44 arranged to switch between different lighting modes of the safety torch 1, especially different lighting modes of the light source. For example, the lighting modes may include an on-mode and an off-mode. Other examples of lighting modes may include a flashing mode and/or a turbo mode, in which the light source can flash faster than in the flashing mode, and/or modes in which is switched from a first light source 3 to a further light source 3, such as a further light source for emitting light coloured differently than light of the first light source. Although in the embodiment shown here, only one control switch 44 is provided, multiple control switches, e.g. one control switch for switching between on and off and another control switch for switching between different coloured light sources, can be provided. Alternatively or additionally, the torch 1 may further comprise a control unit arranged for controlling the at least one light source 3, wherein at least one control switch 44 can be connected to the control unit such that said control switch 44 can be used for providing input to the control unit regarding a desired lighting mode. For instance, the control unit can be arranged for providing the light source 3 with a pulsed power supply in order to allow the light source 3 to flash.

It is noted that the switching between the different lighting modes is preferably irrespectively of the respective position of the circuit switch 35. This is, the lighting mode may for instance be switched from on to off or from off to on by means of the control switch 44, irrespective of the position of the circuit switch 35, i.e. irrespective from whether the first or the second battery system is connected to the light source 3.

In the embodiments of FIGS. 1-4, the handle 6 is provided with at least one operating knob 40 at an end 5 opposite the head 4 of the housing 2 and/or the cartridge 36 is provided with at least one operating knob 40, preferably at a distal end 45 of the cartridge 36. Advantageously, the operating knob can comprise the circuit switch 35 and/or the control switch 44. The safety torch 1 can be arranged such that a portion 46 of the battery system cartridge 36 protrudes from the housing 2, when said cartridge 36 is in an inserted position, wherein the at least one operating knob 40 can provided at said protruding portion 46.

As stated before, the operating knob 40 can comprise or form the control switch 44. Said operating knob 40 and/or the control switch 44 may for instance comprise a push knob and/or a push-push mechanism for switching between an on-mode and an off-mode of the light source 3.

In embodiments, an inner side of the handle 6 is tapered for tight fitting receiving the cartridge 36, preferably tapered near the head 4 of the housing 2, and/or wherein an outer side of the cartridge 36 is tapered for tight fitting reception in the handle 6. Advantageously, said outer side can be tapered near a proximal end 46 of the cartridge 36. However, alternative or additional means may be provided for connecting the cartridge 36 to the housing 2 and/or for retaining the cartridge 36 in said housing 2. Such means may for instance comprise screw thread and/or a click mechanism, such as a mechanism comprising click fingers.

Alternatively or additionally, an end of the handle 6 can be provided with an opening 47 for removing the cartridge 36. Consequently, the safety torch 1 can allow for a relatively easy removal and replacement of the cartridge 36, for instance removal and replacement that lacks the need to perform cumbersome actions such as demounting and mounting back different parts of the housing, which may include unscrewing and screwing back multiple screws.

Moreover, the safety torch 1 can comprise a battery indicator for providing information about a state of charge of at least one of the battery systems 7a, 7b, preferably the first battery system 7a. Advantageously, the indicator can provide information about the state of the battery system which is currently in contact with the light source 3, i.e. the battery system that is then feeding the light source or which can then be made feeding the light source 3 by switching the control switch 44 to its on-mode. In embodiments, the battery indicator can for instance comprise a LED. The indicator can for example be provided at the cartridge 36 or at the housing, preferably at its handle 6.

Further, the invention relates to a set 100. Said set 100 comprises a safety torch 1 such as for instance according to one of the embodiments described above and an additional battery system cartridge 136 arranged for accommodating a primary battery system 37a and a secondary battery system 37b, said cartridge 136 being removably insertable into the handle 6 of the torch 1. Advantageously, the set 100 may comprise batteries and/or additionally batteries and/or a holder suitable for mounting inside a vehicle and for holding said safety torch 1 therein.

Further, the knob 40 may be replaced by and/or may be coupled to additional tool elements, such as a loading port for loading the batteries, or a loading port for loading an electrical device such as a mobile phone, etc. Many variants for the knob 40 are possible. Also, the handle and/or the knob may be provided with e.g. a clip to connect the torch to trousers or to a car interior. Further, the handle and/or the knob may be provided with a connecting element for connecting to a holder system. In the embodiments shown here in FIGS. 1-4, the connecting element is provided as a recess on the handle in the longitudinal direction of the handle.

The invention is not restricted to the embodiments described above. It will be understood that many variants are possible.

For example, the safety torch 1 can comprise connecting elements 50, which may preferably be provided at the housing 2, and which connecting elements 50 are for cooperation with corresponding connecting elements of a holder 51, e.g. a holder for holding multiple tools in a vehicle, such as a car, caravan, bus, train wagon or boat.

An embodiment of a holder 51 is shown in FIGS. 5-7. In this embodiment the holder 51 comprises a base holder element 52 and at least one intermediate holder element 53 which are arranged for removable coupling to each other. The intermediate element 53 is arranged for removable coupling to a safety tool, such as a safety hammer or a safety torch or any other tool of the applicant. At one end 53a, the intermediate element 53 is arranged for coupling to a safety tool via the connecting element 54, and is arranged for removable coupling to the base holder element 52 at another end 53b via a connecting element 55. The intermediate holder element 53 may be injection moulded, preferably as a single piece. The connecting element 54 may be arranged to removable connect with the connecting element 50 on the housing 2 of the safety tool. In this embodiment, the connecting element 54 is arranged as a rib that may fit in the groove 50 of the housing 2. Many variants of the connecting element 54, as well as of the connecting element 50 may be possible, such as a click, a hook, a bayonet, a clamp connection, etc.

In this embodiment, the ribs 54 are positioned at a distance from each other at ends of a U-shaped end 53a of the intermediate holder 53 such that a housing 2 of a safety tool may be fit inbetween to firmly connect to the tool to the intermediate holder element 53. FIG. 6 shows an embodiment in which a safety tool 1 is fitted between the U-shaped end 53a. The ribs 54 fit into the grooves 50 of the housing 2. By providing the end 53a as a U-shaped part, some spring working may be obtained, e.g. by inclining the legs somewhat inwardly of by providing the distance between the ribs 54 somewhat smaller than the width of the tool 1, etc.

At an other end 53b the intermediate element may be arranged for connection to the base element 52. The connection is in this embodiment provided by a screw 55. By providing a screw connection, the position between the intermediate holder element 53 with respect to the base holder element 52 may be varied. For example, the intermediate holder 53 may be positioned in line with the base holder 52, as can be seen in FIG. 7a, or may be positioned at an angle with respect to the base holder 52, as can be seen in FIG. 7b.

The base holder element 52 is at one end 52a arranged for attachment to the intermediate holder 53 and is at an opposite end 52b provided with an attachment element 56 for attachment to a car interior. The attachment element 56 is here provided comprising a clamp 56a and a screw 56b. Possible configurations for attachment to a car interior 57, here a middle console, are shown in FIGS. 7a and 7b. Attachment to other interior parts of a vehicle interior such as a vehicle door panel or a sun visor etc.

The base holder element may comprise a metal plate enclosed by a plastic covering. In this embodiment, the base holder element 52 comprises a hole at end 52a for screw 55 to attach the base holder 52 to the intermediate holder element 53. At side 52b, the base holder element 52 is here provided with a hole for screw 56b to attach the clamp 56a. A part of the vehicle interior to which the holder may be attached, such as a door panel, or a mid console, etc., may be inserted between the base holder element 52 and the clamp 56. By fastening the screw 56b, the vehicle interior part may be clamped inbetween and the holder 51 may be attached.

The clamp 56 may be U-shaped and may be approximately as wide as the base holder element 52. The clamp 56 may extend to grip at the underside 52b of the base holder element 52, and may extend over approximately the width of the underside 52b, which may keep the clamp 56 aligned with the base holder 52 and may prevent rotation of the clamp 56 with respect to the base holder 52 while being fastened.

Figure 8:
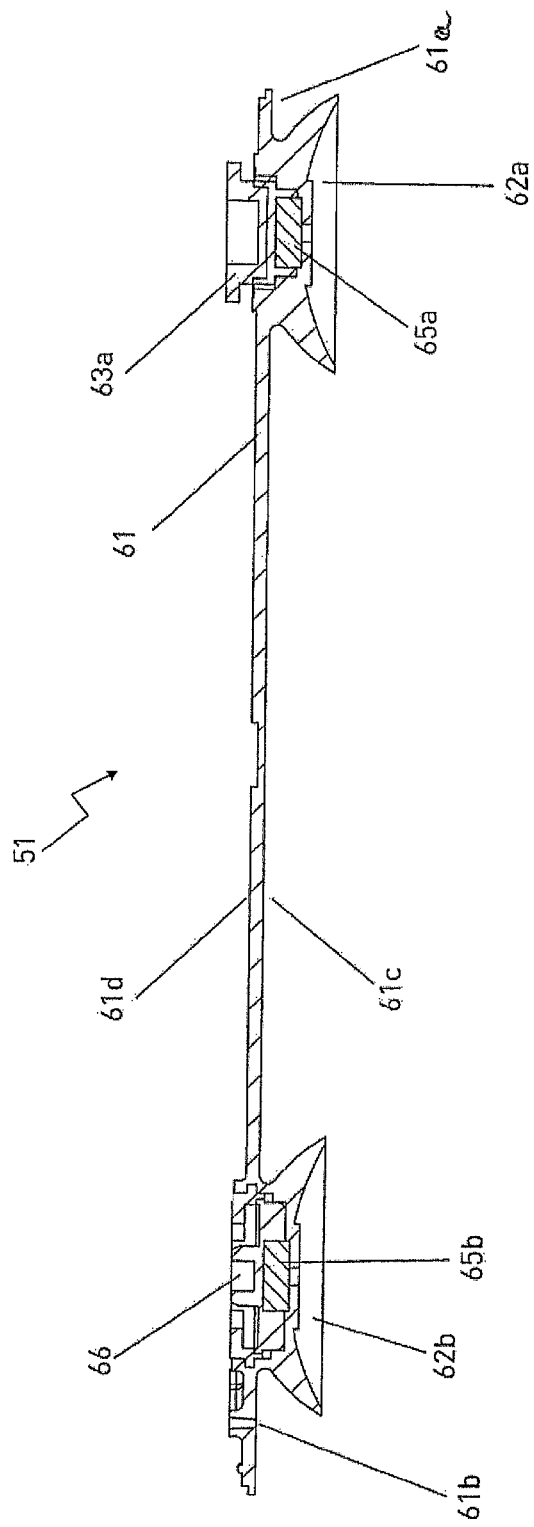
FIG. 8 shows a schematic side view of a second embodiment of a holder in an elongated position.

FIG. 8 shows a second embodiment of a holder 51. The holder 51 here may comprise an elongated strip 61 of which both ends may be provided with a suction cup 62. One end 61a of the strip 61 may be provided with a suction cup 62a, an opposite end 61b of the strip 61 may be provided with a suction cup 62b. The suction cups 62a, 62b may be provided at one side of the strip 61, for example an under side 61c, at an other side, for example an upper side 61d opposite of the under side 61c, of the strip 61a connecting element 63 for connection to the safety tool 1 may be provided. The connecting element 63 may be a single connecting element, e.g. positioned approximately in the center of the length of the strip, and/or two connecting elements may be provided, e.g. each connecting element may be provided at an end of the strip and/or multiple connecting elements may be provided for removable connecting the strip to the tool. FIG. 8 shows the holder 51 in an elongated position.

In this embodiment, the connecting element 63a is positioned at the end 61a of the strip 61. The connecting element 63a is arranged for cooperation with a corresponding connecting element 64 on the safety tool 1.

In an embodiment, a second connecting element 63b may be provided and/or a third connecting element 63c may be provided.

The suction cups 62a, 62b may provide for attachment to relatively smooth surfaces such as glass and/or plastic and/or metal. Attachment of the strip 61 to such a surface may be provided by suction force.

In an embodiment, as for example shown in FIG. 8, additionally magnets 65a, 65b may be provided. The magnets 65a, 65b may be inserted behind the suction cups 62a, 62b, such that the cup of the suction cups 62a, 62b may cover the magnets 65a, 65b as may be seen in FIG. 8. In alternative embodiments, the magnets may be absent.

The holder 51 comprising the strip 61 with the suction cups 62a, 62b may be manufactured from plastic material. The plastic material may provide for a rigid strip, alternatively, the plastic material may provide for a flexible strip. Using plastic materials and/or a production process that allows for a flexible strip, may allow for bending and/or folding of the strip.

Further, the strip 61 may be provided with a storing element 66 for storing a cover 67 that may cover the connecting element 64 of the tool 1. For example, when the strip 61 is connected to the connecting element 64 of the tool 1, the cover 67 may be stored in the storing element 66. When the holder 51 may not be connected to the connecting element 64 of the tool 1, the connecting element 64 may be covered with the cover 67 which may prevent water and/or dirt and/or dust from entering an interior of the tool 1.

Figure 9:
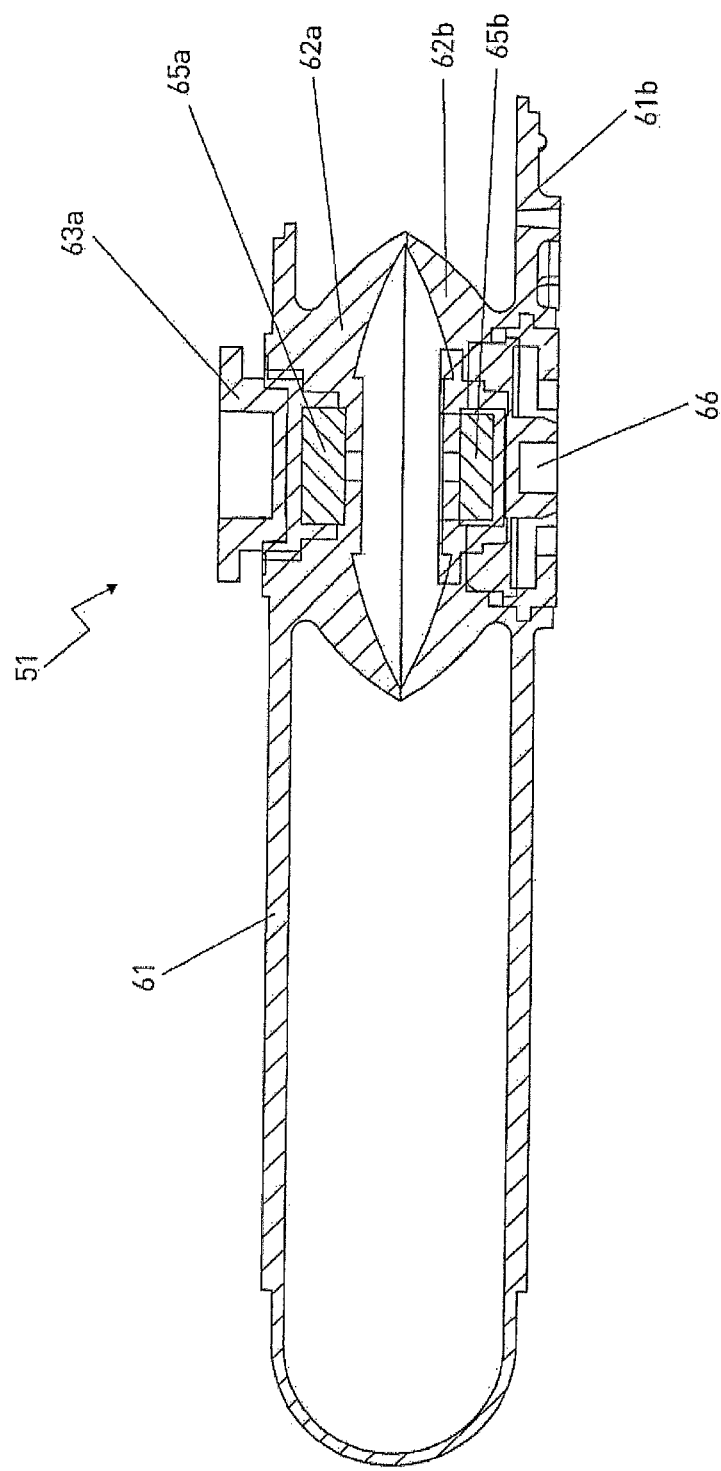
FIG. 9 shows a schematic side view of the holder of FIG. 8 in a folded position.
Figure 12A:
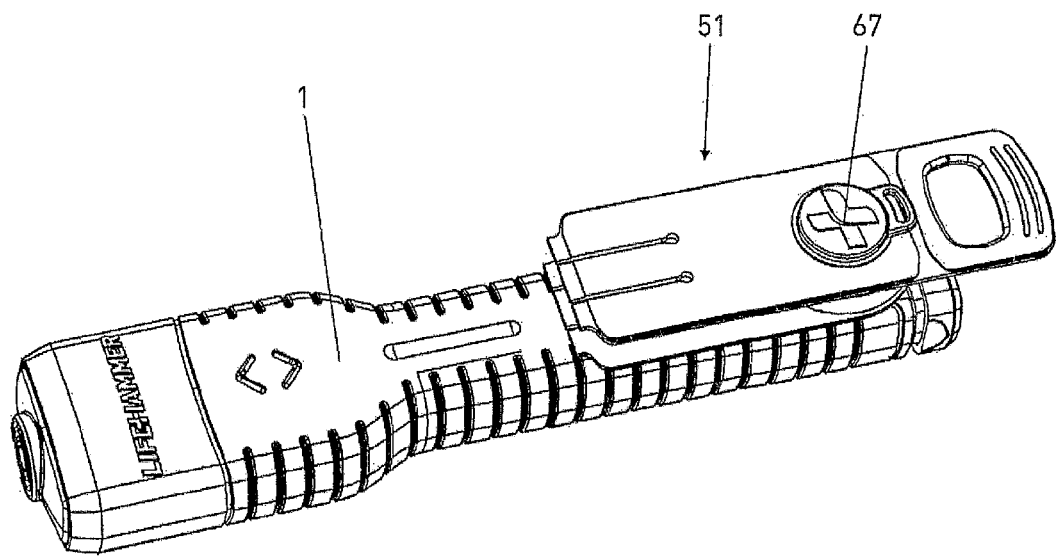
FIG. 12a shows a schematic perspective view of the holder connected to the safety tool in a compact position.
Figure 12B:
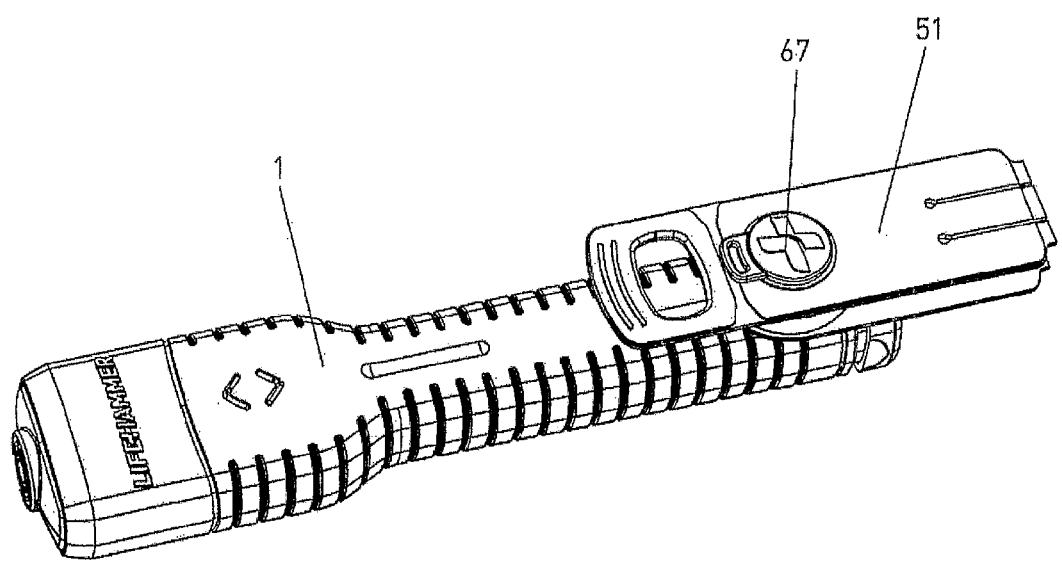
FIG. 12b shows a schematic perspective view of the holder connected to the safety tool in an extended position.

FIG. 9 shows an embodiment of a holder 51 with a flexible strip 61 in a folded position. In such a folded position, the holder 51 may be coupled to the tool 1 for example via the connecting element 63a that may connect to the connecting element 64 of the tool 1, as can be seen for example in FIG. 12a and FIG. 12b. The cover 67 of the connecting element 64 may then be stored in the storing element 66. The folded holder 51 may for example be connected to the tool 1 in a compact position as shown in FIG. 12a. The holder 51 then may be in line with the tool 1 and may extend towards a head of the tool 1. In another embodiment, the folded holder 51 may be connected to the tool 1 in an extended position, wherein the holder extends outwardly with respect to the tool. In another embodiment, the connecting element 64 and the corresponding connecting element 63*a* may be arranged to provide for a connection that may allow angular variation of the position of the holder 51 with respect to the tool 1. In the embodiment shown in FIGS. 12*a* and 12*b*, the connecting elements 64 and 63*a* provide for a bayonet connection thus basically allowing an in-line position with respect to the tool 1, for example an angle of approximately 0 deg in FIG. 12*a* and an angle of approximately 180 deg in FIG. 12*b*. Other connections may allow for other angles, for example a click connection and/or a clamp connection etc.

In the folded position of the holder 51, the magnets 65*a* and 65*b* are facing each other, and may attract each other when having different polarities. In the folded position, an object may be fitted between the magnets 65*a* and 65*b* and as such the holder 51 may be folded around such object to attach to such object. The object may for example be a trousers belt, or a door panel, or a vehicle floor mat etc. Many variants of the object may be possible.

Figure 10A:
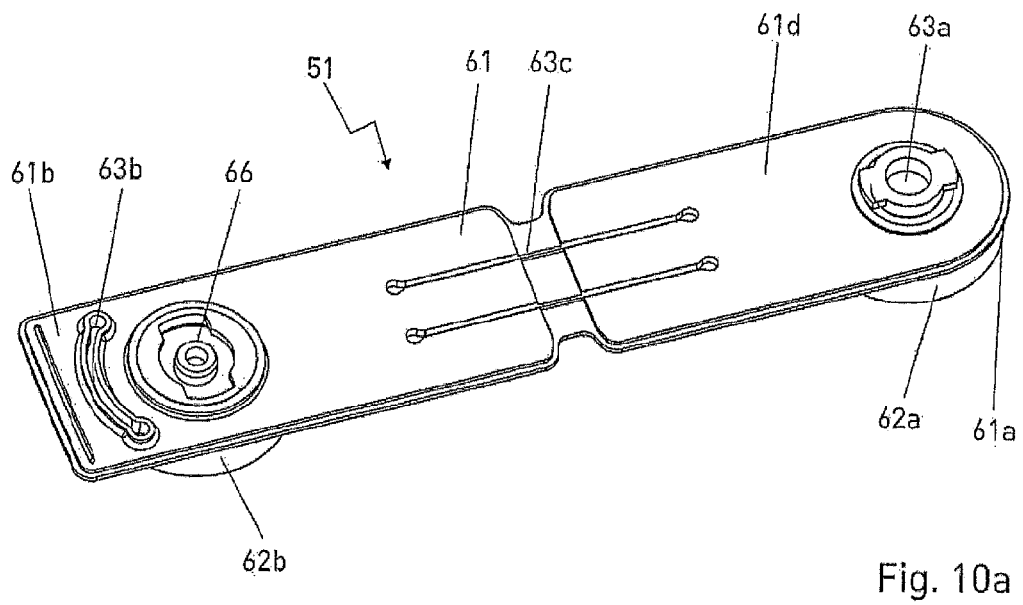
FIG. 10a shows a schematic perspective view of a first side of the holder.
Figure 10B:
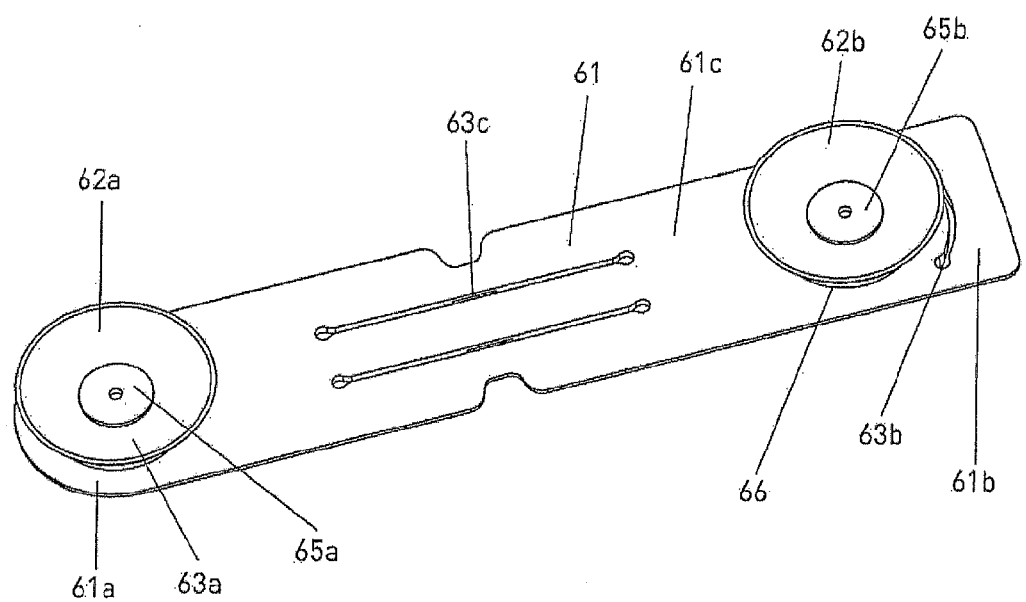
FIG. 10b shows a schematic perspective view of a second side opposite the first side of the holder.
Figure 11:
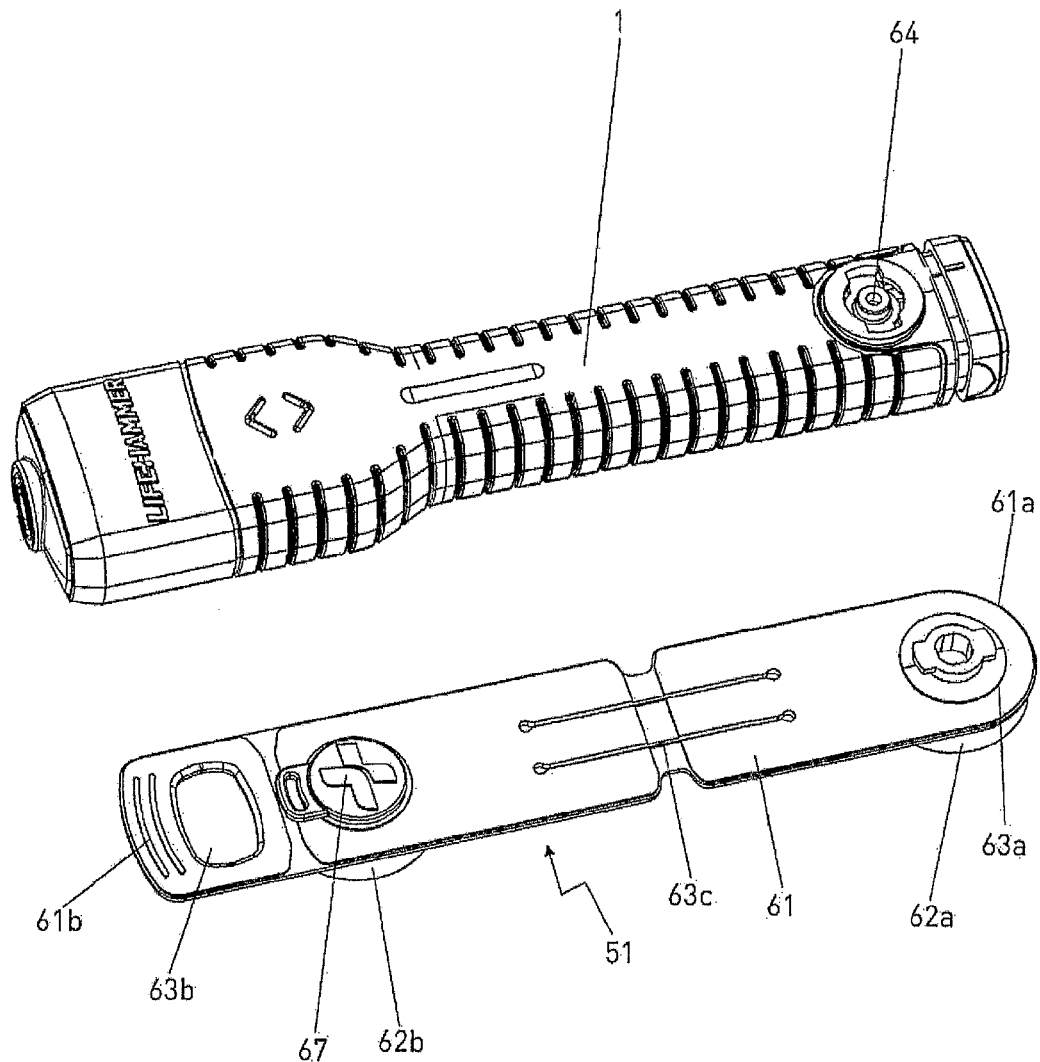
FIG. 11 shows a schematic perspective view of a set of a safety tool and the holder of FIG. 8.
Figure 13A:
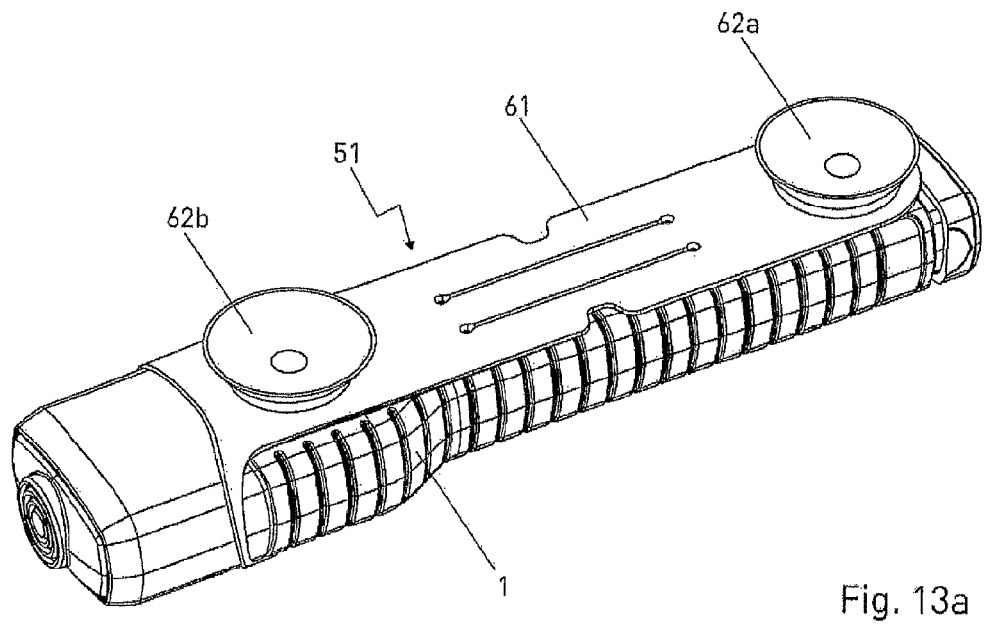
FIG. 13a shows a schematic perspective view of a set of a holder connected to a safety tool in an elongated position.
Figure 13B:
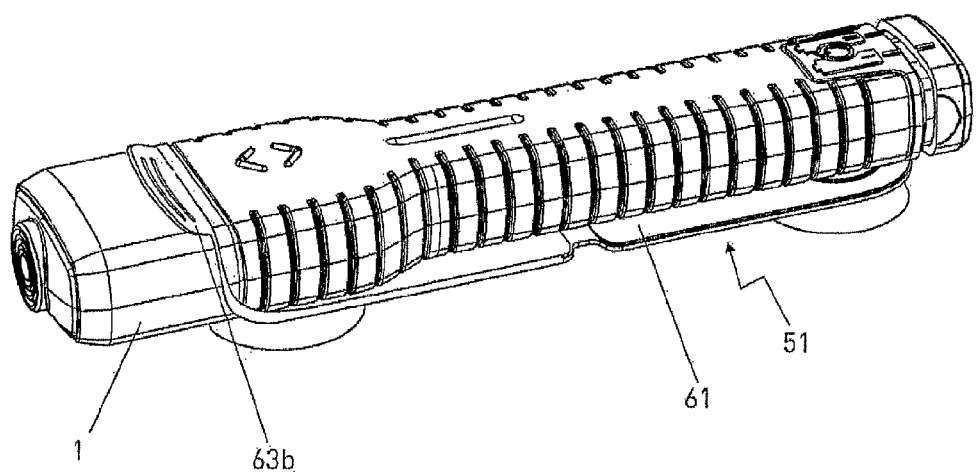
FIG. 13b shows a schematic perspective of the set of FIG. 13a from an opposite side.

In the perspective view of the upper side 61*d* in FIG. 10*a* and of the lower side 61*c* in FIG. 10*b*, it may be seen that the holder 51 may comprise two additional connecting elements 63*b* and 63*c*. The connecting element 63*b* is here provided as a slit at end 61*b* of the strip 61. Through the slit an end of the tool 1 may be inserted, as can be seen in FIG. 13*a*. and FIG. 13*b*. The strip 61 may then be connected to the tool 1 at one end 61*a* with the connecting element 63*a* cooperating with the connecting element 64 of the tool 1 and at the opposite end 61*b* with the connecting element 63*b* through which it may be inserted. Then, the strip 61 is connected to the tool 1 in an elongated position.

Figure 14:
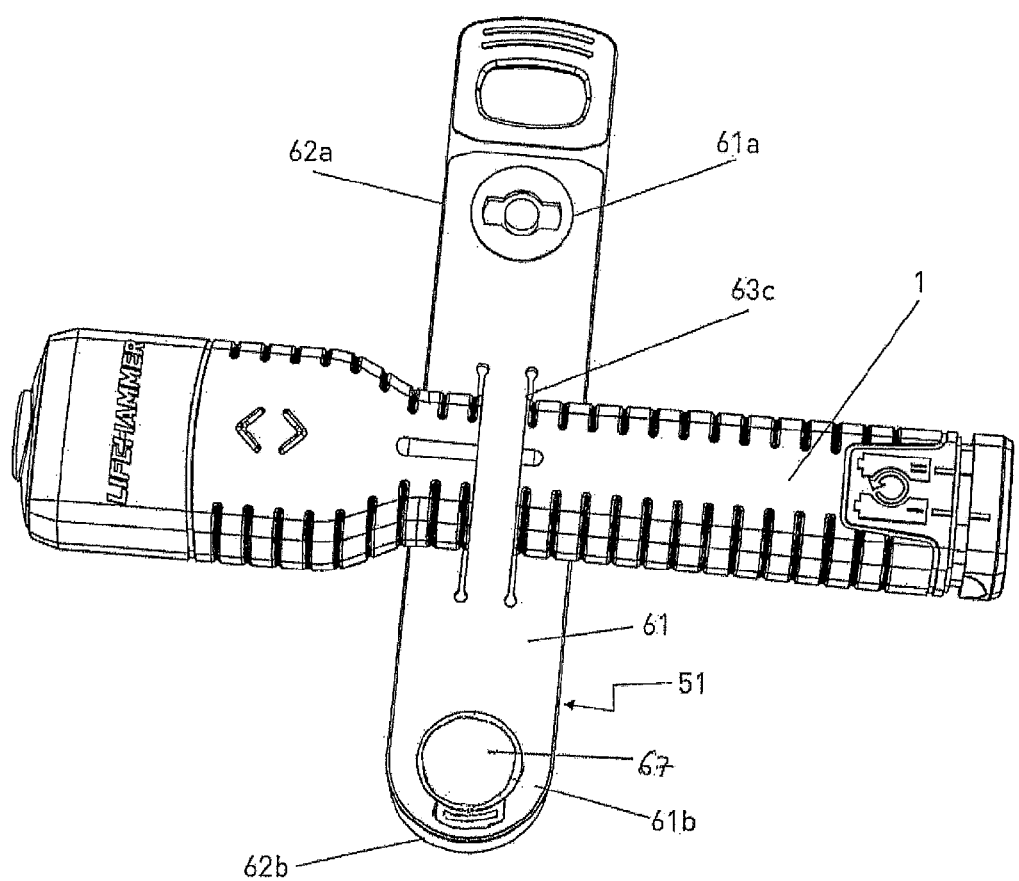
FIG. 14 shows a schematic perspective view of a set of a holder connected to a safety tool in a transverse position.

The connecting element 63*c* is here provided approximately in the middle of the length of the strip 61 and is provided as two approximately parallel slits. The tool 1 may then be inserted through these slits to be connected to the holder 51. Then the tool 1 may be connected to the holder 51 in a transverse configuration as can be seen in FIG. 14.

Many variants of the connecting elements 63*a*, 63*b*, 63*c* may be possible. The strip 61 may be provided with a single connecting element, that may be positioned at various positions on the strip 61, e.g. at one end, in the middle, at an other end, etc. The strip 61 may also be provided with two or more connecting elements, which may be at various positions on the strip 61. For example, there may be two click fingers at opposite ends on the strips, or there may be two pin and/or clamp connections provided at opposite ends and/or parallel at one end or centrally, etc.

In the embodiments shown, there is a holder 51 with two suction cups at one side of the strip 61. Alternatively, there may be a single suction cup provided or there may be three or more suction cups provided.

Alternatively or additionally, the safety torch 1 can be provided with attachment means for attachment of external elements to the torch 1. For example, a suspension hook can be such an external element that may be, for instance releasably, attachable to the torch 1.

As another example, the safety torch 1 can comprise a power outlet, such as a plug or socket, for feeding an external device, such as a mobile phone. Hence, the cartridge 36 can be used as a back-up power source, for instance for use in emergency situations.

Alternatively or additionally, the safety torch 1, especially the battery system cartridge 36 thereof, can comprise a power inlet, such as a plug or socket, for recharging at least one of the battery systems of said torch 1. Said power inlet can for instance be provided at the protruding portion of the cartridge 36.

Alternatively or additionally, the safety torch 1 can be provided with other elements, such as for example an integrated safety hammer and/or an integrated belt cutter.

These and other embodiments will be apparent to the person skilled in the art and are considered to lie within the scope of the invention as formulated by the following claims. Further, features and aspects of one embodiment may be combined with features and aspects of other embodiments in accordance with the teachings herein

The invention claimed is:

1. A safety torch comprising:
a housing;
a light source arranged in a head of the housing, wherein an end of the housing opposite the head forms a handle in which at least one battery system is arranged; and
at least one of: an at least partly translucent light source cover and an at least partially transparent light source cover, for at least partly covering the light source,
wherein the light source cover is adjustable between a retracted position in which said cover is at least partly retracted in the head of the housing, to emit in use a beam of light, and a protruding position in which the cover is protruding from the housing, at least protruding further from said housing than in said retracted position, wherein the light source cover is adjustable between said positions by means of an adjusting mechanism, wherein the adjusting mechanism comprises two substantially parallel guides arranged in the longitudinal direction of the housing, for adjusting the light source cover along the guides,
wherein the light source cover is adjustable along the guides against a biasing force of a resilient element that biases the cover towards one of said positions.

2. The safety torch according to claim 1, wherein the cover is provided with an integrated lens at a distal end of said cover.

3. The safety torch according to claim 1, wherein the cover comprises at least one side surface that is at least one of: partly translucent and/or partially transparent.

4. The safety torch according to claim 1, wherein the resilient element comprises a spring arranged around one of the guides.

5. The safety torch according to claim 1, wherein the light source cover is connected to a cover base for supporting the light source cover, wherein said cover base is arranged for cooperation with the guides for moving the base along the guides between the retracted and protruding positions.

6. The safety torch according to claim 5, wherein the cover base is removably connected to the cover.

7. The safety torch according to claim 5, wherein the light source cover comprises two cooperating elements to cooperate with the two guides for moving the base along the guides between the retracted and protruding positions.

8. The safety torch according to claim 1, further comprising at least one restriction element to slow down movement of the cover along the guides.

9. The safety torch according to claim 8, wherein the restriction element is provided at a cover base connected to at least one of: the light source cover and at least partly around the respective guide.

10. A safety torch comprising:
a housing;

a light source arranged in a head of the housing, wherein an end of the housing opposite the head forms a handle in which at least one battery system is arranged; and at least one of: an at least partly translucent light source cover and an at least partially transparent light source cover, for at least partly covering the light source, wherein the light source cover is adjustable between a retracted position in which said cover is at least partly retracted in the head of the housing, to emit in use a beam of light, and a protruding position in which the cover is protruding from the housing, at least protruding further from said housing than in said retracted position, wherein the light source cover is adjustable between said positions by means of an adjusting mechanism, wherein the adjusting mechanism comprises two substantially parallel guides arranged in the longitudinal direction of the housing, for adjusting the light source cover along the guides, wherein a bridge part is provided between the two guides at or near distal ends of said guides.

11. The safety torch according to claim 10, wherein the light source is provided at the bridge part.

12. The safety torch according to claim 11, wherein the light source is in electrically conductive connection with both guides, such that said light source can be brought in electric connection with the respective battery system via said two guides.

13. The safety torch according to claim 1, wherein the adjusting mechanism comprises a push-push mechanism for adjusting the cover.

14. The safety torch according to claim 13, wherein the push-push mechanism comprises a pin movable in a groove provided at an inner side of the housing.

15. The safety torch according to claim 14, wherein the groove provides for a first path along which the pin is movable when adjusting the cover from the retracted to the protruding position and a second path along which the pin is movable when adjusting the cover from the protruding position to the retracted position.

16. The safety torch according to claim 1, wherein the guides are electrically connected to the respective at least one battery system.

17. A safety torch comprising:

a housing;

a light source arranged in a head of the housing; and at least one of: an at least partly translucent light source cover and an at least partially transparent light source cover, for at least partly covering the light source, wherein an end of the housing opposite the head forms a handle that is arranged for housing a primary battery system and a secondary battery system; wherein the safety torch further comprises a circuit switch arranged to be brought from a first position, in which the primary battery system can feed the light source and the secondary battery system is interrupted from feeding the light source, into a second position, in which the secondary battery system can feed the light source and the primary light source is interrupted from feeding the light source, and wherein the safety torch further comprises a battery system cartridge arranged for accommodating the primary battery system and the secondary battery system, said cartridge being removably insertable into the handle.

18. The safety torch according to claim 1, further comprising a control switch arranged to switch between different lighting modes of the safety torch, wherein the switching between the different lighting modes is irrespective of the respective position of a circuit switch.

19. The safety torch according to claim 1, wherein the handle is provided with an operating knob at an end opposite the head of the housing or a cartridge is provided with an operating knob at a distal end of the cartridge, or both.

20. The safety torch according to claim 19, wherein the operating knob comprises a control switch.

21. The safety torch according to claim 19, wherein the operating knob is a push knob for switching between an on-mode and an off-mode of the light source.

22. The safety torch according to claim 17, wherein an inner side of the handle is tapered near the head of the housing for tight fitting receiving the cartridge or wherein an outer side of the cartridge is tapered near a proximal end of the cartridge for tight fitting reception in the handle, or both.

23. The safety torch according claim 17, wherein a proximal end of the handle, opposite the head, is provided with an opening for removing the cartridge from said handle.

24. The safety torch according to claim 1, further comprising a battery indicator for providing information about a state of charge of at least one of the battery systems which is feeding the light source or which is brought into a position feeding the light source by switching a control switch.

25. A set comprising the safety torch according to claim 17 and an additional cartridge arranged for accommodating the primary battery system and the secondary battery system, said cartridge being removably insertable into the handle of the torch.

26. The safety torch according to claim 10, wherein the light source cover is provided with an integrated lens at a distal end of said cover.

27. The safety torch according to claim 10, wherein the light source cover is adjustable along the guides against a biasing force of a resilient element that biases the cover towards one of said positions.

28. The safety torch according to claim 10, wherein the light source cover is connected to a cover base for supporting the light source cover, wherein said cover base is arranged for cooperation with the guides for moving the base along the guides between the retracted and protruding positions.

29. The safety torch according to claim 28, wherein the light source cover comprises two cooperating elements to cooperate with the two guides for moving the base along the guides between the retracted and protruding positions.

30. The safety torch according to claim 10, further comprising at least one restriction element to slow down movement of the cover along the guides.

31. The safety torch according to claim 10, further comprising a control switch arranged to switch between different lighting modes of the safety torch, wherein the switching between the different lighting modes is irrespective of the respective position of a circuit switch.

32. The safety torch according to any claim 10, wherein the handle is provided with an operating knob at an end opposite the head of the housing, or wherein the cartridge is provided with an operating knob at a distal end of the cartridge, or both.

33. The safety torch according to claim 17, wherein the light source cover is provided with an integrated lens at a distal end of said cover.

34. The safety torch according to claim 17, further comprising a control switch arranged to switch between different lighting modes of the safety torch, wherein the switching between the different lighting modes is irrespective of the respective position of the circuit switch.

35. The safety torch according to any claim 17, wherein the handle is provided with an operating knob at an end opposite the head of the housing, or wherein the cartridge is provided with an operating knob at a distal end of the cartridge, or both.

36. The safety torch according to claim 17, further comprising a battery indicator for providing information about a state of charge of at least one of the battery systems which is feeding the light source or which is brought into a position feeding the light source by switching a control switch.

* * * * *